US012808759B2

(12) United States Patent
Delgado et al.

(10) Patent No.: US 12,808,759 B2
(45) Date of Patent: Nov. 24, 2026

(54) LIGHTING MODULE FOR BIOLOGICAL ANALYSIS AND BIOLOGICAL ANALYSIS SYSTEMS AND METHODS

(71) Applicant: BECKMAN COULTER, INC., Brea, CA (US)

(72) Inventors: Eduardo Delgado, Miami Lakes, FL (US); Bart Wanders, Trabuco Canyon, CA (US); Carol Quon, Genoa, NV (US); Gabriel Santos, Miami, FL (US); John Mcdonald, Malibu, CA (US)

(73) Assignee: BECKMAN COULTER, INC., Brea, CA (US)

( * ) Notice: Subject to any disclaimer, the term of this patent is extended or adjusted under 35 U.S.C. 154(b) by 271 days.

(21) Appl. No.: 18/224,937

(22) Filed: Jul. 21, 2023

(65) Prior Publication Data

US 2024/0027327 A1 Jan. 25, 2024

Related U.S. Application Data

(60) Provisional application No. 63/391,545, filed on Jul. 22, 2022, provisional application No. 63/391,536,
(Continued)

(51) Int. Cl.
*G01N 15/14* (2024.01)
*B01L 3/00* (2006.01)
(Continued)

(52) U.S. Cl.
CPC .......... *G01N 1/31* (2013.01); *B01L 3/502715* (2013.01); *G01N 1/30* (2013.01);
(Continued)

(58) Field of Classification Search
CPC ........ G01N 1/31; G01N 15/1433; G01N 1/30; G01N 15/1436; G01N 2015/016;
(Continued)

(56) References Cited

U.S. PATENT DOCUMENTS

| | | | |
|---|---|---|---|
| 5,422,712 | A | 6/1995 | Ogino |
| 5,436,978 | A | 7/1995 | Kasdan |

(Continued)

FOREIGN PATENT DOCUMENTS

| | | | |
|---|---|---|---|
| CN | 110891687 | B | 8/2022 |
| EP | 0 822 404 | | 4/1998 |

(Continued)

OTHER PUBLICATIONS

U.S. Appl. No. 18/224,947, entitled Biological Sample Staining Module and Biological Analysis Systems and Methods, filed Jul. 21, 2023.

(Continued)

*Primary Examiner* — Jamil Ahmed
(74) *Attorney, Agent, or Firm* — FBT Gibbons LLP

(57) ABSTRACT

A biological imaging analyzer is described comprises a staining module configured to stain cells of a biological sample so as to produce stained cells. The analyzer also comprises a lighting module configured to illuminate the stained cells, the lighting module comprising a plurality of pulsed lights. The analyzer further comprises an imaging module configured to capture images of the stained cells. A method of flow imaging a biological sample comprises flowing the biological sample including the stained cells through an image capture region of a flowcell. The method also comprises utilizing the lighting module to illuminate the stained cells at the image capture region with the plurality of pulsed lights. The method further comprises capturing images of the stained cells at the image capture region with the imaging module.

20 Claims, 30 Drawing Sheets

Related U.S. Application Data filed on Jul. 22, 2022, provisional application No. 63/391,549, filed on Jul. 22, 2022.

(51) Int. Cl.

| | |
|---|---|
| ***G01N 1/30*** | (2006.01) |
| ***G01N 1/31*** | (2006.01) |
| ***G01N 15/1433*** | (2024.01) |
| ***G01N 15/1434*** | (2024.01) |
| ***G02B 21/06*** | (2006.01) |
| ***G02B 21/36*** | (2006.01) |
| *G01N 15/01* | (2024.01) |
| *G01N 15/10* | (2006.01) |

(52) U.S. Cl.

CPC ..... *G01N 15/1433* (2024.01); *G01N 15/1436* (2013.01); *G02B 21/06* (2013.01); *G02B 21/36* (2013.01); *B01L 2200/025* (2013.01); *B01L 2300/0609* (2013.01); *B01L 2300/0654* (2013.01); *B01L 2300/0883* (2013.01); *B01L 2400/082* (2013.01); *G01N 2001/302* (2013.01); *G01N 2015/016* (2024.01); *G01N 2015/1006* (2013.01); *G01N 2015/144* (2013.01); *G01N 2015/1461* (2013.01)

(58) Field of Classification Search

CPC ..... G01N 2001/302; G01N 2015/1006; G01N 2015/144; B01L 3/502715; B01L 2200/025; B01L 2300/0609; B01L 2300/0654; B01L 2300/0883; B01L 2400/082; G02B 21/06; G02B 21/36

See application file for complete search history.

(56) References Cited

U.S. PATENT DOCUMENTS

| | | | | |
|---|---|---|---|---|
| 5,444,527 | A | 8/1995 | Kosaka | |
| 5,544,140 | A * | 8/1996 | Seagrave | G11B 7/131 |
| 7,867,443 | B2 | 1/2011 | Key et al. | |
| 8,018,592 | B2 | 9/2011 | Tabata | |
| 9,279,750 | B2 | 3/2016 | Cremins et al. | |
| 9,322,752 | B2 | 4/2016 | Wanders et al. | |
| 9,322,753 | B2 | 4/2016 | Cremins | |
| 9,360,413 | B2 | 6/2016 | Baigar et al. | |
| 9,429,524 | B2 | 8/2016 | Wanders | |
| 9,470,618 | B2 | 10/2016 | Farrell et al. | |
| 9,575,063 | B2 | 2/2017 | Li et al. | |
| 9,857,361 | B2 | 1/2018 | Wanders et al. | |
| 10,234,392 | B2 | 3/2019 | Li et al. | |
| 10,670,817 | B2 | 6/2020 | Feingold et al. | |
| 10,705,008 | B2 | 7/2020 | Wanders et al. | |
| 11,333,597 | B2 | 5/2022 | Yan et al. | |
| 11,642,670 | B2 | 5/2023 | Cappi et al. | |
| 2003/0017081 | A1 | 1/2003 | Trulson et al. | |
| 2010/0032584 | A1 | 2/2010 | Dayong et al. | |
| 2013/0084227 | A1 | 4/2013 | Cole et al. | |
| 2014/0320861 | A1 | 10/2014 | van den Engh et al. | |
| 2016/0054222 | A1 | 2/2016 | Tateyama et al. | |
| 2016/0231494 | A1 * | 8/2016 | Feingold | G02B 6/4298 |
| 2019/0302391 | A1 | 10/2019 | Misener et al. | |
| 2020/0033249 | A1 * | 1/2020 | Adams | G02B 7/36 |
| 2020/0309802 | A1 | 10/2020 | Accurso et al. | |
| 2021/0108994 | A1 | 4/2021 | Quon | |
| 2022/0205925 | A1 | 6/2022 | Belz et al. | |
| 2022/0276250 | A1 * | 9/2022 | Yasuda | G01N 1/36 |

FOREIGN PATENT DOCUMENTS

| | | | |
|---|---|---|---|
| EP | 2861958 | A1 | 4/2015 |
| EP | 3651902 | B1 | 4/2022 |
| EP | 4006525 | A1 | 6/2022 |
| EP | 4 162 254 | | 4/2023 |
| JP | H0643090 | A | 2/2002 |
| JP | 202057707 | A | 9/2020 |
| KR | 2021 0085832 | A | 7/2021 |
| WO | WO 2017/158431 | A1 | 9/2017 |
| WO | WO 2023/049047 | | 3/2023 |
| WO | WO 2023/114204 | A1 | 6/2023 |

OTHER PUBLICATIONS

U.S. Appl. No. 18/224,953, entitled Flowcell Holder and Biological Analysis Systems and Methods, filed Jul. 21, 2023.

International Search Report and Written Opinion for PCT/US23/28395 mailed Nov. 14, 2023, 8 pages.

International Search Report and Written Opinion for PCT/US23/28396 mailed Nov. 13, 2023, 11 pages.

International Search Report and Written Opinion for PCT/US23/28398 mailed Oct. 23, 2023, 11 pages.

Mitrani et al.; "The Immature Reticulocyte Fraction as an Aid in the Diagnosis and Prognosis of Parvovirus B19 Infection in Sickle Cell Disease", Blood (2018) 132 (Supplement 1); 3678. 5 pages.

* cited by examiner

LIGHTING MODULE FOR BIOLOGICAL ANALYSIS AND BIOLOGICAL ANALYSIS SYSTEMS AND METHODS

PRIORITY

This application claims the benefit of U.S. Pat. App. No. 63/391,536, entitled “Lighting Module for Biological Analysis,” filed Jul. 22, 2022, U.S. Pat. App. No. 63/391,545, entitled “Biological Sample Staining Module,” filed Jul. 22, 2022, and U.S. Pat. App. No. 63/391,549, entitled “Flowcell Holder,” filed Jul. 22, 2022, the disclosures of which are incorporated by reference herein.

BACKGROUND

Various types of tests related to patient diagnosis and therapy can be performed by analysis of patient samples. This could include analysis of the patient’s microorganisms, or “microbes,” as well as analysis of samples to determine chemistry, antigen, antibodies, blood cell count, particulates (e.g., sediment) and other factors that may influence patient health. Microbes are microscopic living organisms such as bacteria, fungi, or viruses, which may be single-celled or multicellular. When analyzing microbes, biological samples containing the patient’s microorganisms may be taken from a patient’s infections, bodily fluids, or abscesses and may be placed in test panels or arrays, combined with various reagents, incubated, and analyzed to aid in treatment of the patient. Analysis of patient chemistry, immunoassay, blood cell count, particulates, and other characteristics may be similarly performed. For these varying analyses, automated biochemical analyzers or biological testing systems have been developed to meet the needs of health care facilities and other institutions to facilitate analysis of patient samples and to improve the accuracy and reliability of results when compared to analysis using manual operations and aid in determining effectiveness of various antimicrobials.

Blood cell analysis is one of the most commonly performed medical tests for providing an overview of a patient’s health status. A blood sample can be drawn from a patient’s body and stored in a test tube containing an anticoagulant to prevent clotting. A whole blood sample normally comprises three major classes of blood cells including red blood cells (erythrocytes), white blood cells (leukocytes) and platelets (thrombocytes). Each class can be further divided into subclasses of members. For example, five major types or subclasses of white blood cells (WBCs) have different shapes and functions. White blood cells may include neutrophils, lymphocytes, monocytes, eosinophils, and basophils. There are also subclasses of the red blood cell types. The appearances of particles in a sample may differ according to pathological conditions, cell maturity and other causes. Red blood cell subclasses may include reticulocytes and nucleated red blood cells.

Traditional methods of blood analysis have involved utilizing indirect methods of analysis (e.g., impedance, light scatter, fluorescent intensity profile) to gather information about blood cells, for instance cell counts and cell types. These technologies however may have limitations in the quality of information obtained about the cells due to these indirect methods.

Newer techniques of analysis can leverage imaging as part of the analytical process. However, there can be challenges with obtaining high quality images sufficient to determine a proper cell count and cell type. There is therefore a need to ensure proper quality of images in order to obtain sufficient cell information useful in blood and biological analysis.

SUMMARY

Described herein are devices, systems and methods for classifying objects such as cells in images captured by analyzers, such as a bioassay system which captures images of blood cells from a blood sample.

In some embodiments, a biological imaging analyzer is described. The analyzer comprises a staining module configured to stain cells of a biological sample so as to produce stained cells. The analyzer also comprises a lighting module configured to illuminate the stained cells, the lighting module comprising a plurality of pulsed lights. The analyzer further comprises an imaging module configured to capture images of the stained cells.

In some embodiments, the analyzer further comprises a flowcell configured to flow the stained cells therethrough, the flowcell further comprising an imaging region where the images are captured. In addition, or alternatively, the imaging module may comprise a camera. The stained cells may be white blood cells with a stained nuclear region.

In some embodiments, the plurality of pulsed lights of the lighting module comprise three light emitting diodes. The three light emitting diodes may comprise a red light emitting diode, a blue light emitting diode, and a green light emitting diode. The analyzer may further comprise three dichroic filters. In addition, or alternatively, the analyzer may further comprise a collimator configured to combine the plurality of pulsed lights into a white light. The lighting module may further comprise a lightpipe configured to randomize the white light.

In some embodiments, a method of flow imaging a biological sample using the biological imaging analyzer is described. The method comprises flowing the biological sample including the stained cells through an image capture region of a flowcell. The method also comprises utilizing the lighting module to illuminate the stained cells at the image capture region with the plurality of pulsed lights. The method further comprises capturing images of the stained cells at the image capture region with the imaging module. The method may also comprise combining the plurality of pulsed lights into a white light. The method may further comprise randomizing the white light.

While multiple examples are described herein, still other examples of the described subject matter will become apparent to those skilled in the art from the following detailed description and drawings, which show and describe illustrative examples of disclosed subject matter. As will be realized, the disclosed subject matter is capable of modifications in various aspects, all without departing from the spirit and scope of the described subject matter. Accordingly, the drawings and detailed description are to be regarded as illustrative in nature and not restrictive.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
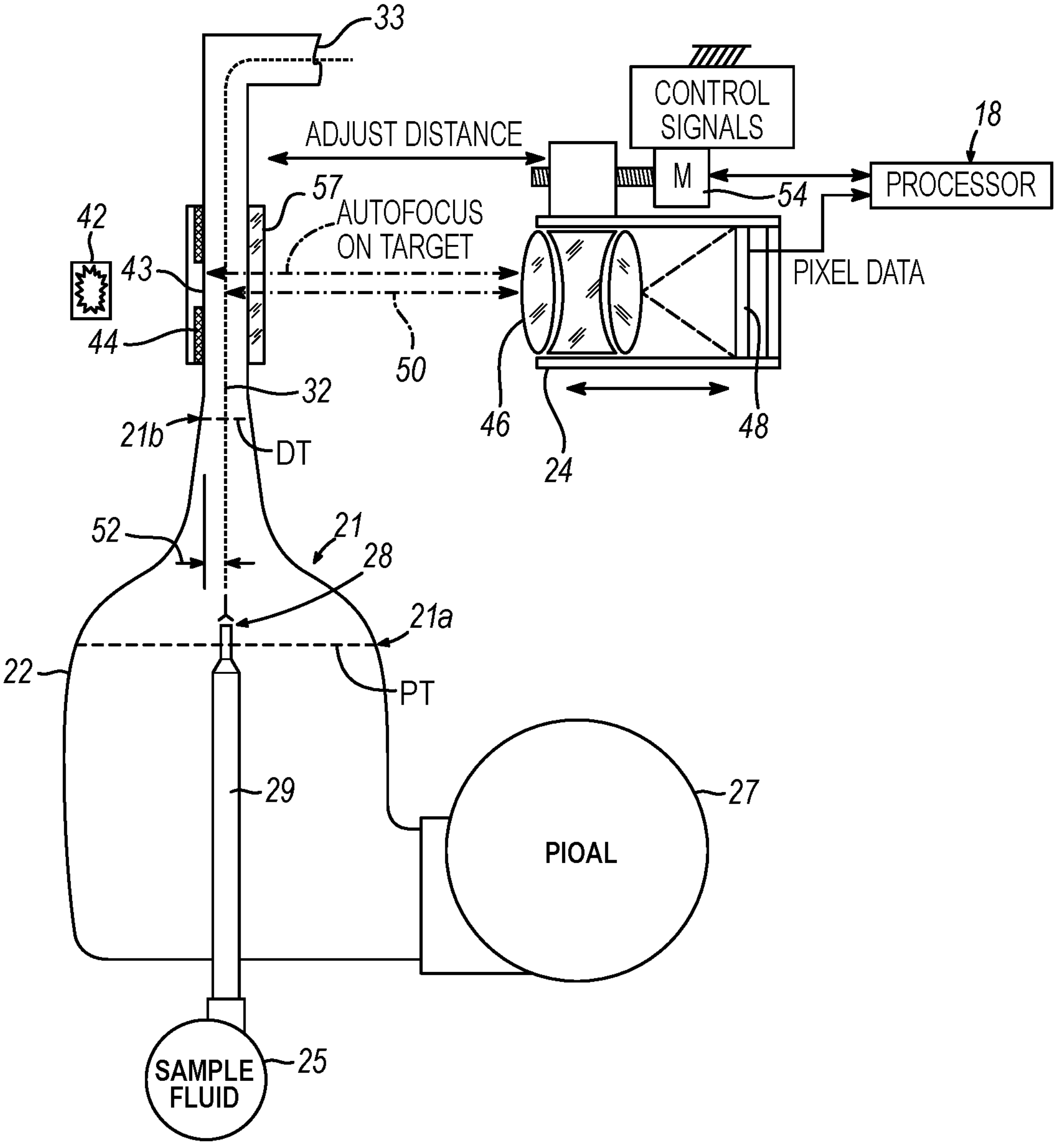
FIG. 1 is a schematic illustration, partly in section and not to scale, showing operational aspects of an exemplary flow cell and high optical resolution imaging device for sample image analysis using digital image processing.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The present disclosure relates to apparatus, systems, compositions, and methods for analyzing a sample containing particles. In one embodiment, the invention relates to an automated particle imaging system which comprises an analyzer which may be, for example, a visual analyzer. In some embodiments, the visual analyzer may further comprise a processor to facilitate automated analysis of the images.

According to some aspects of this disclosure, a system comprising a visual analyzer may be provided for obtaining images of a sample comprising particles suspended in a liquid. Such a system may be useful, for example, in characterizing particles in biological fluids, such as detecting and quantifying erythrocytes, reticulocytes, nucleated red blood cells, platelets, and white blood cells, including white blood cell differential counting, categorization and subcategorization and analysis. Other similar uses such as characterizing blood cells from other fluids are also contemplated.

The discrimination and/or classification of blood cells in a blood sample is an exemplary application for which the subject matter is particularly well suited, though other types of body fluid samples may be used. For example, aspects of the disclosed technology may be used in analysis of a non-blood body fluid sample comprising blood cells (e.g., white blood cells and/or red blood cells), such as serum, bone marrow, lavage fluid, effusions, exudates, cerebrospinal fluid, pleural fluid, peritoneal fluid, and amniotic fluid. It is also possible that the sample can be a solid tissue sample, e.g., a biopsy sample that has been treated to produce a cell suspension. The sample may also be a suspension obtained from treating a fecal sample. A sample may also be a laboratory or production line sample comprising particles, such as a cell culture sample. The term sample may be used to refer to a sample obtained from a patient or laboratory or any fraction, portion or aliquot thereof. The sample can be diluted, divided into portions, or stained in some processes.

In some aspects, samples are presented, imaged and analyzed in an automated manner. In the case of blood samples, the sample may be substantially diluted with a suitable diluent or saline solution, which reduces the extent to which the view of some cells might be hidden by other cells in an undiluted or less-diluted sample. The cells can be treated with agents that enhance the contrast of some cell aspects, for example using permeabilizing agents to render cell membranes permeable, and histological stains to adhere in and to reveal features, such as granules and the nucleus. In some cases, it may be desirable to stain an aliquot of the sample for counting and characterizing particles which include reticulocytes, nucleated red blood cells, and platelets, and for white blood cell differential, characterization and analysis. In other cases, samples containing red blood cells may be diluted before introduction to the flow cell and/or imaging in the flow cell or otherwise.

As described earlier, imaging cells can offer enhanced benefits to characterization and offer an advancement from the traditional, non-imaging technology. However, capturing images with sufficient quality and resolution to enable this characterization can be difficult. Aspects herein include the use of flow imaging, that is use of a sample driven through a flowcell with an imaging region. It is challenging to capture a "still" image of the sample cells within a biological sample as the sample moves through the analysis region of the flowcell. For example, the sample may be moving at a speed of about 20 cm/s as it moves through the analysis region of the flowcell, such that it may be difficult to capture a clear, still image of the sample cells.

In some embodiments presented herein, and as will be explained in further detail herein, a biological sample may be driven through a flowcell of a biological testing system for analysis. For example, such a testing system may include a microscope imaging system, which may be equipped with an imaging device such as a high-speed, high-resolution camera configured to image a biological sample (e.g., blood) as the biological sample passes through an analysis region of the flowcell. Such microscope imaging systems may include an optical element known as an "objective" that collects light from the biological sample to form a magnified image of the sample, which may then be focused onto an imaging sensor of the camera at an image-forming plane via a tube lens, for example.

I. System Overview

Turning now to the drawings, FIG. 1 schematically shows an exemplary flow cell 22 for conveying a sample fluid through a viewing zone 23 of a high optical resolution imaging device 24 in a configuration for imaging microscopic particles in a sample flow stream 32 using digital image processing. Flow cell 22 is coupled to a source 25 of sample fluid which may have been subjected to processing, such as contact with a particle contrast agent composition and heating. Flow cell 22 is also coupled to one or more sources 27 of a particle and/or intracellular organelle alignment liquid (PIOAL), such as a clear glycerol solution having a viscosity that is greater than the viscosity of the sample fluid.

The sample fluid is injected through a flattened opening at a distal end 28 of a sample feed tube 29, and into the interior of the flow cell 22 at a point where the PIOAL flow has been substantially established resulting in a stable and symmetric laminar flow of the PIOAL above and below (or on opposing sides of) the ribbon-shaped sample stream. The sample and PIOAL streams may be supplied by precision metering pumps that move the PIOAL with the injected sample fluid along a flowpath that narrows substantially. The PIOAL envelopes and compresses the sample fluid in the zone 21 where the flowpath narrows. Hence, the decrease in flowpath thickness at zone 21 can contribute to a geometric focusing of the sample stream 32. The sample fluid ribbon 32 is enveloped and carried along with the PIOAL downstream of the narrowing zone 21, passing in front of, or otherwise through the viewing zone 23 of, the high optical resolution imaging device 24 where images are collected, for example, using a CCD 48. In this way, flow imaging is performed where images from the flowing sample stream and the cellular material contained therein are collected. Processor 18 can receive, as input, pixel data from CCD 48. The sample fluid ribbon flows together with the PIOAL to a discharge 33.

As shown here, the narrowing zone 21 can have a proximal flowpath portion 21*a* having a proximal thickness PT and a distal flowpath portion 21*b* having a distal thickness DT, such that distal thickness DT is less than proximal thickness PT. The sample fluid can therefore be injected through the distal end 28 of sample tube 29 at a location that is distal to the proximal portion 21*a* and proximal to the distal portion 21*b*. Hence, the sample fluid can enter the PIOAL envelope as the PIOAL stream is compressed by the zone 21. wherein the sample fluid injection tube has a distal exit port through which sample fluid is injected into flowing sheath fluid, the distal exit port bounded by the decrease in flowpath size of the flow cell.

The digital high optical resolution imaging device 24 with objective lens 46 is directed along an optical axis that intersects the ribbon-shaped sample stream 32. The relative distance between the objective 46 and the flow cell 22 is variable by operation of a motor drive 54, for resolving and collecting a focused digitized image on a photosensor array. Additional information regarding the construction and operation of an exemplary flow cell such as shown in FIG. 1 is provided in U.S. Pat. No. 9,322,752, entitled "Flowcell Systems and Methods for Particle Analysis in Blood Samples," issued on Apr. 26, 2016, the disclosure of which is hereby incorporated by reference in its entirety; and/or U.S. Pat. No. 9,470,618, entitled "Sheath Fluid Systems and Methods for Particle Analysis in Blood Samples," issued on Oct. 18, 2016, the disclosure of which is hereby incorporated by reference in its entirety.

Figure 2:
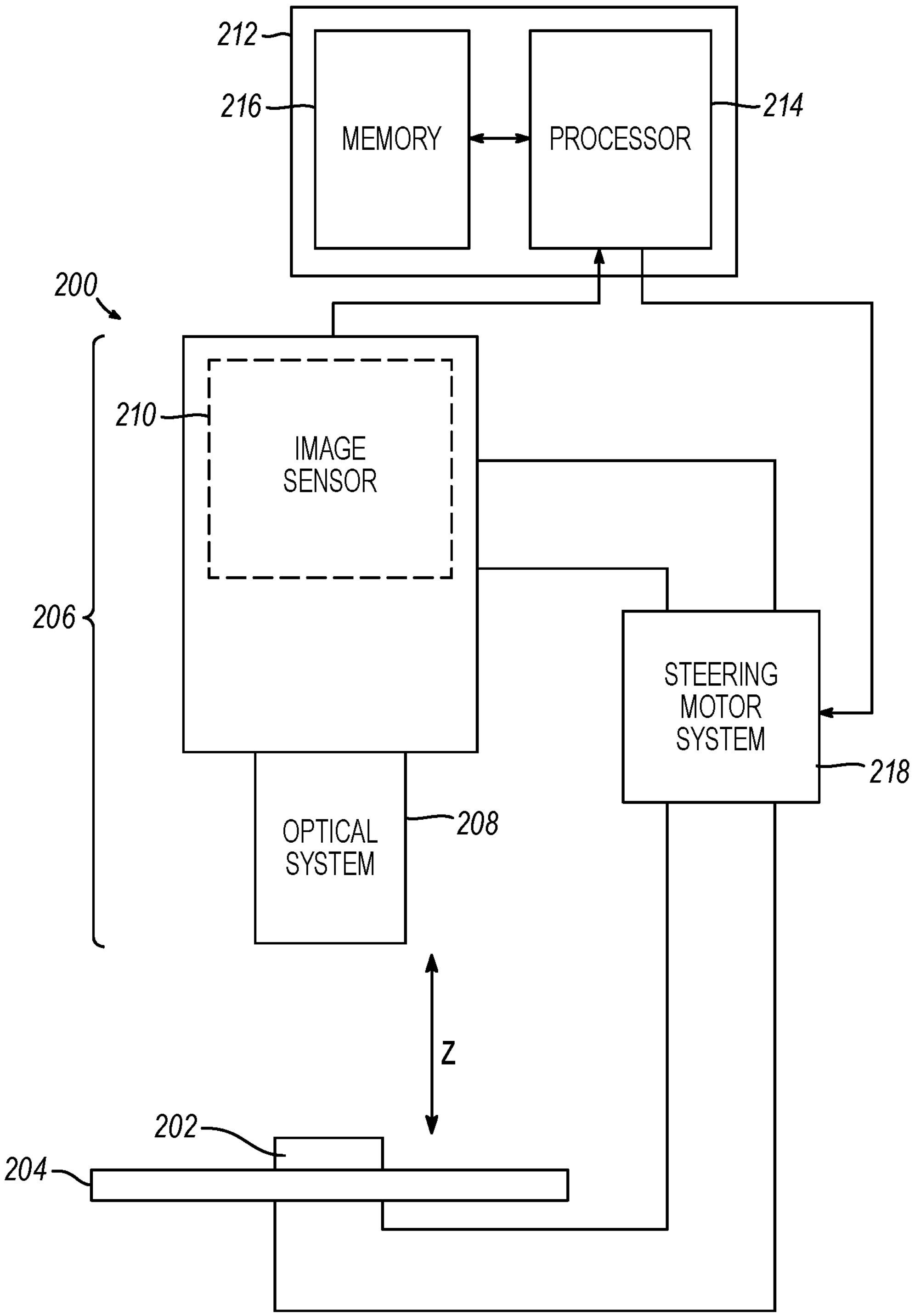
FIG. 2 illustrates a slide-based vision inspection system in which aspects of the disclosed technology may be used.

Aspects of the disclosed technology may also be applied in contexts other than flow cell systems such as shown in FIG. 1. For example, FIG. 2 illustrates a slide-based vision inspection system 200 in which aspects of the disclosed technology may be used. In the system shown in FIG. 2, a slide 202 comprising a sample, such as a blood sample, is placed in a slide holder 204. The slide holder 204 may be adapted to hold a number of slides or only one, as illustrated in FIG. 2. An image capturing device 206, comprising an optical system 208 and an image sensor 210, is adapted to capture image data depicting the sample in the slide 202.

The image data captured by the image capturing device 206 can be transferred to an image processing device 212. The image processing device 112 may be an external apparatus, such as a personal computer, connected to the image capturing device 206. Alternatively, the image processing device 212 may be incorporated in the image capturing device 206. The image processing device 212 can comprise a processor 214, associated with a memory 216, configured to determine changes needed to determine differences between the actual focus and a correct focus for the image capturing device 206. When the difference is determined an instruction can be transferred to a steering motor system 218. The steering motor system 218 can, based upon the instruction from the image processing device 212, alter the distance z between the slide 202 and the optical system 208. Descriptions of approaches which may be used for focusing using this type of setup are provided in U.S. Pat. No. 9,857,361, entitled "Flowcell, Sheath Fluid, and Autofocus Systems and Methods for Particle Analysis in Urine Samples," issued on Jan. 2, 2018, the disclosure of which is hereby incorporated by reference in its entirety; and/or U.S. Pat. No. 10,705,008, entitled "Autofocus Systems and Methods for Particle Analysis in Blood Samples," issued on Jul. 7, 2020, the disclosure of which is hereby incorporated by reference in its entirety.

II. Example of Lighting Module

In the context of imaging, including the flow imaging concepts discussed for biological imaging, proper illumination is important in order to enable proper visualization of the biological material (e.g., blood cells). The illumination is an important criterion of an image capture device (e.g., camera) capturing clear and well-lit sample images—for instance, in order for an algorithm to properly identify a cell type.

Figure 3:
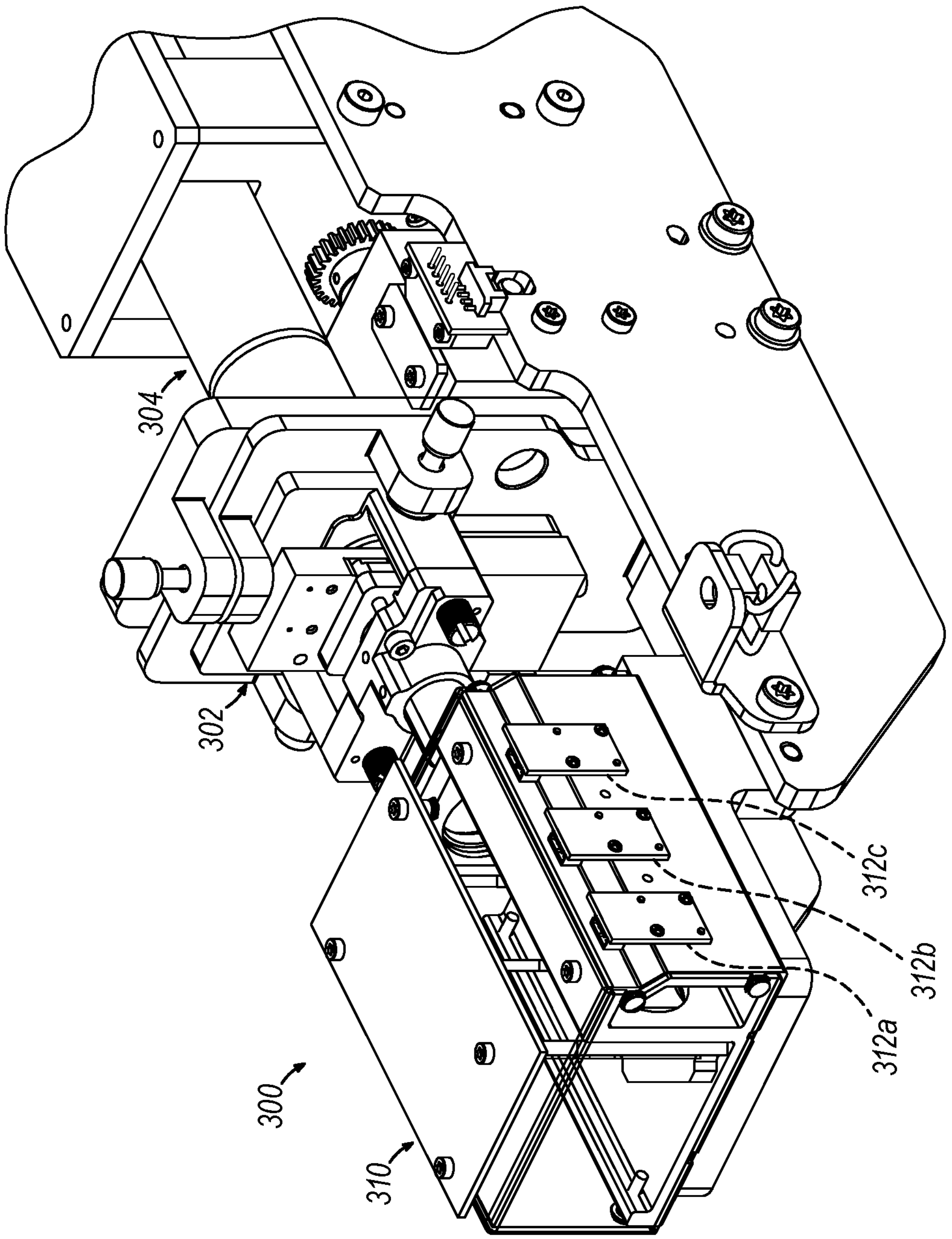
FIG. 3 illustrates a perspective view of an exemplary lighting module in conjunction with another exemplary flow cell and high optical resolution imaging device for sample image analysis using digital image processing.
Figure 4:
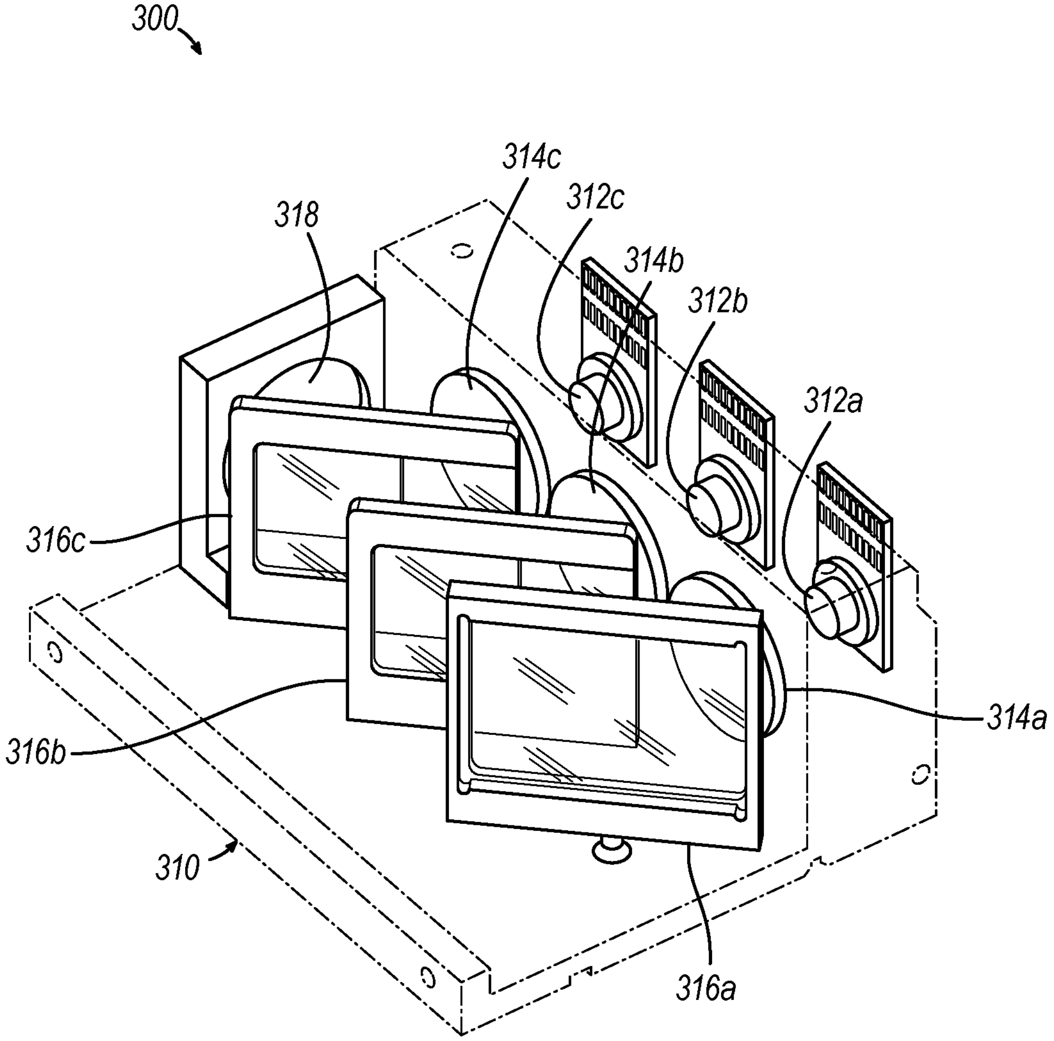
FIG. 4 illustrates a perspective view of the lighting module of FIG. 3, with a portion of the housing omitted to show light emitters, focusing lenses, dichroic elements, and a collimating lens of the lighting module.
Figure 5:
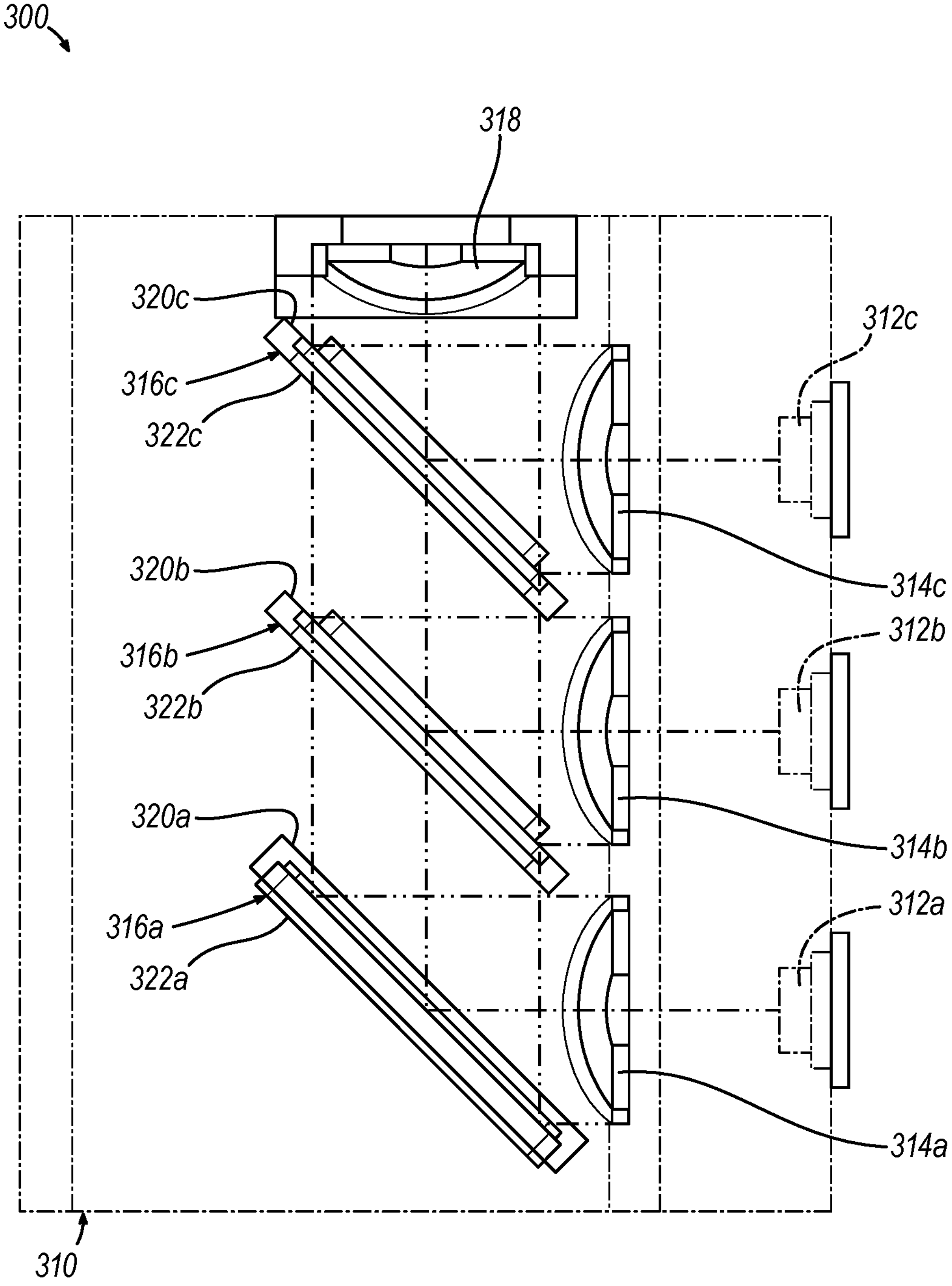
FIG. 5 illustrates a top plan view of the lighting module of FIG. 3, showing light traveling from each of the light emitters to the collimating lens.

In a system such as shown in FIG. 1 or FIG. 2, a lighting module (also referred to as an illumination system or a lighting device) 300 such as shown in FIG. 3 may be used to illuminate cells imaged by a camera such as the high optical resolution imaging device 24 of FIG. 1, or the image sensor 210 of FIG. 2. For example, the lighting module 300 may be incorporated in place of the light source 42 shown in FIG. 1. FIG. 3 shows the lighting module 300 in conjunction with an exemplary flowcell 302, which may be configured and operable like the flow cell 22 shown in FIG. 1, as well as a high optical resolution imaging device 304, which may be configured and operable like the high optical resolution imaging device 24 shown in FIG. 1. As shown, the lighting module 300 is positioned on a side of the flowcell 302 opposite the high optical resolution imaging device 304 for illuminating an analysis region such as a viewing zone (also referred to as image capture region or an imaging region) of the flowcell 302 as a sample moves through the analysis region to facilitate the capturing of images of the sample by the high optical resolution imaging device 304. The cells of the sample may be stained prior to moving through the flowcell 302 via a staining module, for example, such as either staining module 400, 500 described below.

In the example shown, the lighting module 300 includes a housing 310, a plurality of light emitters 312*a*, 312*b*, 312*c*, a plurality of focusing lenses 314*a*, 314*b*, 314*c*, a plurality of dichroic elements 316*a*, 316*b*, 316*c*, and a collimating lens 318. The light emitters 312*a*, 312*b*, 312*c* may each be any suitable light source including, for example, an arc lamp, a light emitting diode (LED), or any other suitable light emitter for providing either pulsed or continuous illumination. In some embodiments, the light emitters 312*a*, 312*b*, 312*c* may each be configured to emit a light of a different color than the other light emitters 312*a*, 312*b*, 312*c*. For example, the first light emitter 312*a* may include a red LED configured to emit red light having a wavelength of between about 600 nanometers and about 650 nanometers, such as about 620 nanometers; the second light emitter 312*b* may include a green LED configured to emit green light having a wavelength of between about 470 nanometers and about 600 nanometers, such as about 525 nanometers; and/or the third light emitter 312*c* may include a blue LED configured to emit blue light having a wavelength of between about 400 nanometers and about 470 nanometers, such as about 450 nanometers.

The light emitters 312*a*, 312*b*, 312*c* are each mounted to a side of the housing 310 in a row that extends generally parallel to an optical axis of the high optical resolution imaging device 304, such that the light emitted by each light emitter 312*a*, 312*b*, 312*c* may be initially projected into an interior of the housing 310 in a direction generally perpendicular to the optical axis of the high optical resolution imaging device 304. As shown, each focusing lens 314*a*, 314*b*, 314*c* is mounted within the housing 310 and is axially aligned with a corresponding one of the light emitters 312*a*, 312*b*, 312*c* for focusing the light emitted by the corresponding light emitter 312*a*, 312*b*, 312*c*.

Each dichroic element 316*a*, 316*b*, 316*c* is mounted within the housing 310 in-line with a corresponding one of the light emitters 312*a*, 312*b*, 312*c* for reflecting and/or filtering the light emitted from one or more of the light emitters 312*a*, 312*b*, 312*c* (and focused by the corresponding focusing lens(es) 314*a*, 314*b*, 314*c*). In this regard, each dichroic element 316*a*, 316*b*, 316*c* of the present example includes a corresponding reflective side 320*a*, 320*b*, 320*c* and a corresponding filtering side 322*a*, 322*b*, 322*c*. Each dichroic element 316*a*, 316*b*, 316*c* is oriented obliquely relative to the optical axis of the high optical resolution imaging device 304 and relative to the light received from the corresponding focusing lens 314*a*, 314*b*, 314*c*. For example, each dichroic element 316*a*, 316*b*, 316*c* may be oriented at an angle of about 45 degrees relative to the optical axis of the high optical resolution imaging device 304. More particularly, each dichroic element 316*a*, 316*b*, 316*c* is oriented such that the corresponding reflective side 320*a*, 320*b*, 320*c* faces generally toward both the corresponding focusing lens 314*a*, 314*b*, 314*c* and the high optical resolution imaging device 304 while the corresponding filtering side 322*a*, 322*b*, 322*c* faces generally away from both the corresponding focusing lens 314*a*, 314*b*, 314*c* and the high optical resolution imaging device 304.

In this manner, the reflective side 320*a*, 320*b*, 320*c* of each dichroic element 316*a*, 316*b*, 316*c* may be configured to reflect the light emitted from the corresponding light emitter 312*a*, 312*b*, 312*c* (and focused by the corresponding focusing lens 314*a*, 314*b*, 314*c*) and traveling generally perpendicular to the optical axis of the high optical resolution imaging device 304 such that the reflected light travels generally parallel to the optical axis of the high optical resolution imaging device 304. For example, the reflective side 320*a* of the first dichroic element 316*a* may be configured to reflect the light emitted from the first light emitter 312*a* (and focused by the first focusing lens 314*a*) such that the reflected light travels generally parallel to the optical axis of the high optical resolution imaging device 304; the reflective side 320*b* of the second dichroic element 316*b* may be configured to reflect the light emitted from the second light emitter 312*b* (and focused by the second focusing lens 314*b*) such that the reflected light travels generally parallel to the optical axis of the high optical resolution imaging device 304; and/or the reflective side 320*c* of the third dichroic element 316*c* may be configured to reflect the light emitted from the third light emitter 312*c* (and focused by the third focusing lens 314*c*) such that the reflected light travels generally parallel to the optical axis of the high optical resolution imaging device 304.

In addition, the filtering side 322*a*, 322*b*, 322*c* of at least some dichroic elements 316*a*, 316*b*, 316*c* may be configured to filter the light received from one or more of the other dichroic elements 316*a*, 316*b*, 316*c*. For example, the filtering side 322*b* of the second dichroic element 316*b* may be configured to filter the light reflected from the first dichroic element 316*a*; and/or the filtering side 322*c* of the third dichroic element 316*c* may be configured to filter the light reflected from the second dichroic element 316*b*, and/or to filter the light reflected from the first dichroic element 316*a* (and filtered by the second dichroic element 316*b*). In this regard, the filtering side 322*a*, 322*b*, 322*c* of each dichroic element 316*a*, 316*b*, 316*c* may be configured to inhibit the passage of light therethrough that has a wavelength below a corresponding predetermined threshold. For example, the filtering side 322*b* of the second dichroic element 316*b* may be configured to inhibit the passage of light therethrough that has a wavelength below a predetermined threshold of about 596 nanometers; and/or the filtering side 322*c* of the third dichroic element 316*c* may be configured to inhibit the passage of light therethrough that has a wavelength below a predetermined threshold of about 484 nanometers. In some cases, the filtering sides 322*b*, 322*c* of the second and third dichroic elements 316*b*, 316*c* may be configured to allow the passage of about 95% of light therethrough that has a wavelength above the corresponding predetermined threshold and/or to inhibit the passage of about 99% of light therethrough that has a wavelength below the corresponding predetermined threshold.

Thus, the light emitted by the first light emitter 312*a* may be focused by the first focusing lens 314*a*, reflected by the reflective side 320*a* of the first dichroic element 316*a*, filtered by the filtering side 322*b* of the second dichroic element 316*b*, and filtered by the filtering side 322*c* of the third dichroic element 316*c*; the light emitted by the second light emitter 312*b* may be focused by the second focusing lens 314*b*, reflected by the reflective side 320*b* of the second dichroic element 316*b*, and filtered by the filtering side 322*c* of the third dichroic element 316*c*; and/or the light emitted by the third light emitter 312*c* may be focused by the third focusing lens 314*c*, and reflected by the reflective side 320*c* of the third dichroic element 316*c*. In this manner, the light emitted by the light emitters 312*a*, 312*b*, 312*c* may be tuned via dichroic elements 316*a*, 316*b*, 316*c* to improve the whiteness of the light prior to being converged together by the collimating lens 318 into a single collimated beam of white light, which may then be transmitted out of the housing 310 toward the flowcell 302.

It will be appreciated that in cases where the first light emitter 312*a* includes a red LED, the red light emitted by the first light emitter 312*a* may be substantially unaffected by the filtering sides 322*b*, 322*c* of the second and third dichroic elements 316*b*, 316*c* due to the relatively high wavelength of the red light, which may be greater than the threshold of either filtering side 322*b*, 322*c*.

The collimated beam of white light formed by the collimating lens 318 may be transmitted toward the flowcell 302 via a lightpipe (also referred to as a lighting column or a lightguide), such as a hexagonal lightpipe. The lightpipe may be configured to collect the collimated beam of white light, randomize the collimated beam of white light, and/or converge the collimated beam of white light onto the flowcell 302 (e.g., at a viewing zone of the flowcell 302). The lightpipe may be positioned relative to the collimating lens 318 such that the collimated beam converges to a point (e.g., phases) at the entry of the lightpipe. The lightpipe may be mounted to a flowcell holder (not shown) that holds the flowcell 302 in order to fixedly secure the exit of the lightpipe relative to the flowcell 302, such as flowcell holder 700 described below. In this way, the distance between the lightpipe and the flowcell 302 is fixed since the lightpipe and flowcell 302 are operatively connected through the flowcell holder 700.

In some embodiments, the light emitters 312*a*, 312*b*, 312*c* may be configured to provide pulsed illumination in a synchronized manner (e.g., simultaneously) with each other in a profile so as to capture a still image of the sample cells moving through the flowcell 302. For example, an objective lens of the high optical resolution imaging device 304 may open; then the light emitters 312*a*, 312*b*, 312*c* may emit pulses of light simultaneously; then an image of the sample cells may be captured by the high optical resolution imaging device 304; then the objective lens of the high optical resolution imaging device 304 may close. This process may be repeated any suitable number of iterations. In some cases, the duration of each pulse may be between about 1 microsecond and about 3 microseconds, such as about 2 microseconds. The pulse frequency may depend on the camera frame acquisition frequency, which may be between about 220 frames per second and about 300 frames per second. For example, 220 frames per second may correspond to one picture about every 4.5 milliseconds. The objective lens may be open for about 100 microseconds, which may be sufficient to capture one image. In some embodiments a higher frame rate may be used, such as with a reduced field of view. Increased speeds may be used depending on the particular application, type of camera used, etc. It will be appreciated that an increase in speed may provide more data (e.g., more images of more sample cells) in less time, while a smaller field of view may remove visual landmarks (e.g., "black bars") that could be used for focusing. It will also be appreciated that the pixel rate may contribute to the amount of data provided. For example, increasing the pixel rate may compensate for decreasing the framerate to provide the same amount of data.

In some embodiments, the light emitters 312*a*, 312*b*, 312*c* may be configured to emit pulses of light sequentially to operate in a diagnostic mode. For example, a time delay may be provided between each flash to capture three separate images of a particular sample cell at three distinct moments along the path of the sample cell. The pixel representation of distance may then be used to calculate the velocity of the sample cell, to determine whether the sample cells are accelerating or decelerating, and/or to determine if the flow is too fast to obtain reliable data. This diagnostic mode may be selectively entered into and exited out of. For example, after operating in the diagnostic mode, the light emitters 312*a*, 312*b*, 312*c* may be configured to emit pulses of light simultaneously as described above in the primary operating mode.

III. Examples of Staining Module

In some embodiments, the flow imaging systems incorporate stain and an associated staining module in order to augment visualization of the biological material (e.g., blood cells). The staining can be useful, for instance, to staining an interior cellular region of a white blood cell to visualize an interior nuclear structure to help identify a cell type (e.g., subset of white blood cell types—e.g., identification as a neutrophil, lymphocytes, monocytes, eosinophils, or basophils). In some examples, the stain is applied to an exterior surface of a cell to augment visualization of the cell (e.g., an exterior stain for red blood cells or platelets).

A. Example of Single-Chamber Staining Module

Figure 6A:
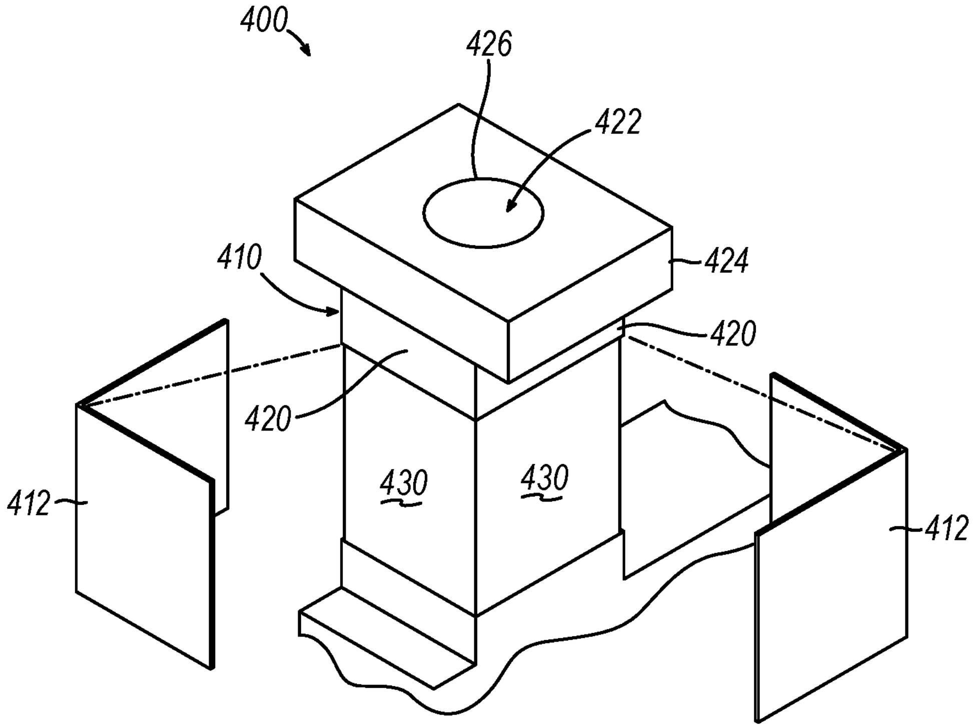
FIG. 6A illustrates a perspective view of an exemplary staining module for mixing a staining agent with a sample to form a sample mixture, and for incubating the sample mixture, showing the lamination of ferromagnetic sheets to a housing of the staining module.
Figure 6B:
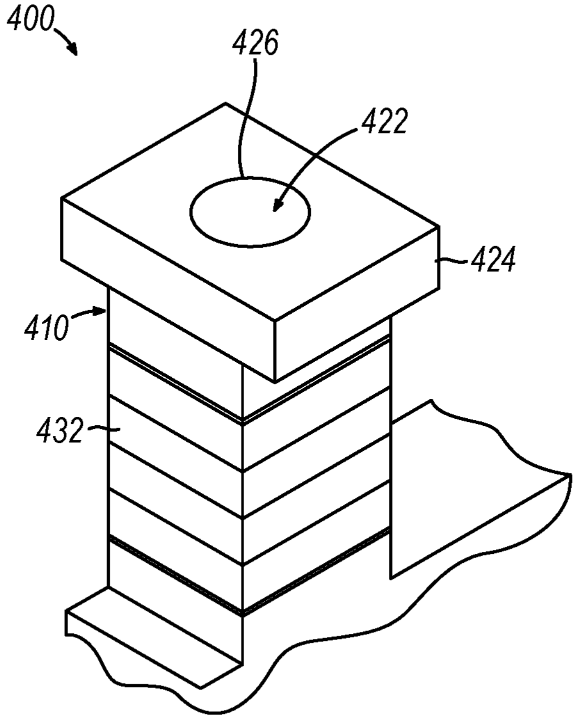
FIG. 6B illustrates a perspective view of the staining module of FIG. 6A, showing the wrapping of the ferromagnetic sheets to the housing with adhesive tape.
Figure 6C:
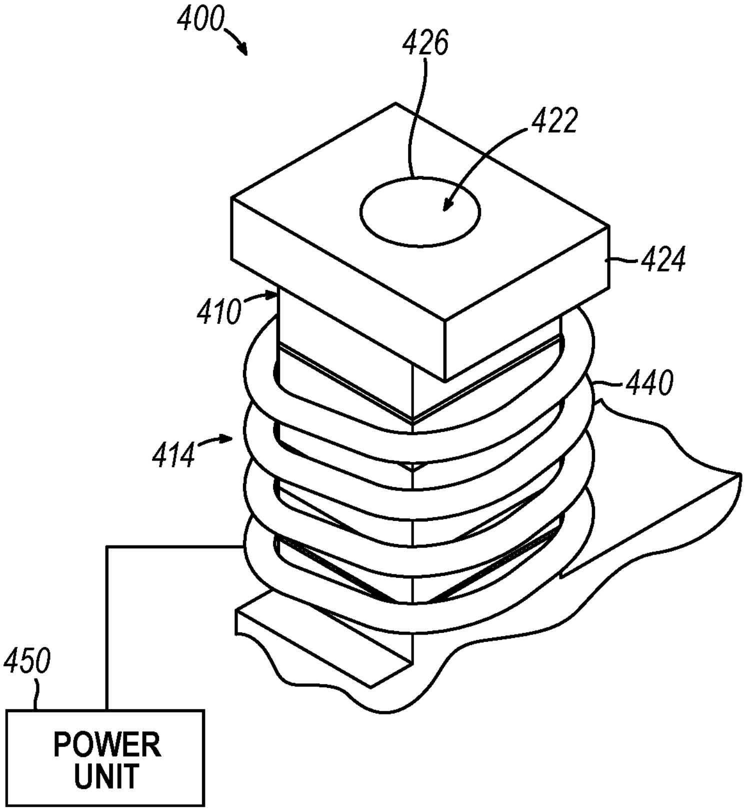
FIG. 6C illustrates a perspective view of the staining module of FIG. 6A, showing the winding of a heating coil of the staining module about the housing.

In a system such as shown in FIG. 1 or FIG. 2, a staining module (also referred to as a staining device) 400 such as shown in FIGS. 6A-6C may be used to both mix a sample with a staining agent and incubate the sample mixture via heating prior to the cells within the sample mixture being imaged by a camera such as the high optical resolution imaging device 24 of FIG. 1, or the image sensor 210 of FIG. 2. For example, the staining module 400 may be incorporated in place of the source 25 shown in FIG. 1 or between the source 25 and the sample feed tube 29 shown in FIG. 1, to facilitate mixing of the sample with the staining agent and incubation of the sample mixture prior to capturing of images of the sample by the high optical resolution imaging device 24. The staining agent may include any suitable composition. For example, the staining agent may be composed in accordance with any one or more teachings of U.S. Pat. No. 9,279,750, entitled "Method and Composition for Staining and Sample Processing," issued on Mar. 8, 2016, the disclosure of which is hereby incorporated by reference in its entirety; and/or U.S. Pat. No. 9,322,753, entitled "Method and Composition for Staining and Processing a Urine Sample," issued on Apr. 26, 2016, the disclosure of which is hereby incorporated by reference in its entirety; and/or US Pub. No. 2021/0108994, entitled "Method and Composition for Staining and Sample Processing," published on Apr. 15, 2021, the disclosure of which is hereby incorporated by reference in its entirety.

In the embodiment shown, the staining module 400 includes a housing 410, a pair of ferromagnetic sheets 412, and a heater in the form of a heating coil 414 (FIG. 6C). In various embodiments, heating coil 414 can comprise a resistive coil, or alternatively an inductive coil. As best shown in FIG. 6A, the housing 410 includes a plurality of (e.g., four) sidewalls 420 which collectively define an interior chamber 422 (also referred to as a sample reservoir) for receiving the staining agent and the sample, mixing the staining agent and the sample to form a sample mixture, and incubating the sample mixture. The housing 410 also includes a top wall 424 and a port 426 extending through the top wall 424 to the interior chamber 422. The port 426 may permit a stain dispenser (not shown) to deliver the staining agent to the interior chamber 422, and/or may permit a sample dispenser (not shown) to deliver the sample to the interior chamber 422 so as to be added to the staining agent.

In some embodiments, the housing 410 may comprise a metallic material having relatively high thermal conductivity, such as aluminum, in order to promote uniform heating of the housing 410 and likewise uniform heating of the contents of the interior chamber 422. In the embodiment shown, the sidewalls 420 of the housing 410 are laminated with respective ferromagnetic sheets 412 to improve the efficiency of the heating (e.g., resistive heating, or alternatively inductive heating) performed by staining module 400 (e.g., due to the relatively low ferromagnetic properties of aluminum). More particularly, each ferromagnetic sheet 412 is secured to the outer surfaces of a corresponding pair of sidewalls 420. It will be appreciated that any suitable number of ferromagnetic sheets 412 may be used to laminate the sidewalls 420. In the embodiment shown, a thermally conductive compound 430 is deposited on the outer surfaces of the sidewalls 420 for adhering the ferromagnetic sheets 412 to the sidewalls 420. As best shown in FIG. 6B, an adhesive tape 432 is tightly wrapped about the ferromagnetic sheets 412 to securely engage the inner surfaces of the ferromagnetic sheets 412 with the outer surfaces of the sidewalls 420.

As best shown in FIG. 6C, the heating coil 414 includes a wire 440 wound about the sidewalls 420 of the housing 410 (and about ferromagnetic sheets 412). The wire 440 may comprise a metallic material having relatively high electrical conductivity, such as copper. The wire 440 may have any suitable cross-sectional area and/or thickness, and may be wound to define any suitable number of turns for the heating coil 414. The heating coil 414 in one embodiment functions as an inductor or induction coil, and is operatively coupled to a power unit 450, which may be configured to drive the heating coil 414 to a frequency at which the heating coil 414 behaves as a resonant circuit that under excitation produces an alternating current thereby producing an alternating magnetic field at or near the heating coil 414. This field may generate an electromagnetic field (EMF) on the outer surfaces of the sidewalls 420, which may in turn cause an alternating current. This current, in conjunction with the resistivity of the housing 410, may yield power dissipation and heat up the outer surfaces of the sidewalls 420. Such heat may be transferred to the contents of the chamber 422, such as the staining agent and/or the sample. It will be appreciated that such induction heating may be performed using relatively low input power, and/or may achieve homogeneous heating of the contents of the chamber 422 and thereby improve staining and/or lysing performance. In this regard, exciting the circuit at the resonant frequency may deliver maximum power, and exciting the circuit at an increasing frequency may effectively adjust the power delivery. Alternative embodiments can utilize a resistive heater/resistance heating coil for heater coil 414.

In some embodiments, a temperature sensor such as a thermistor (not shown) may be configured to continuously sense the temperature of the contents of the chamber 422. The temperature sensor may be configured to send feedback signals indicative of the sensed temperatures to a controller (not shown) which may in turn be configured to send control signals to the power unit 450 for selectively driving the heating coil 414. In this manner, the controller may cease heating of the contents of the chamber 422 upon reaching a threshold temperature. In one example, the controller utilizes heating control algorithms and the feedback signals are incorporated into elements of the algorithms or computer-driven instructions provided to the power unit 450 and/or heating coil 414 to optimally regulate temperature. In some embodiments, the controller may be configured to send control signals to a maintenance heater (not shown) for maintaining the contents of the chamber 422 at the threshold temperature.

In one embodiment, a plurality of staining modules are contemplated, each utilizing the structure of FIGS. 6A-6C (i.e., a plurality of structural elements 400). In this way, a plurality of samples can be stained, incubated, or otherwise prepared at a similar time. In one example, each staining module has its own unique heating element. In one example a staining module has a plurality of chambers 422, each capable of receiving a sample, and a common heating structure connected to the entire module (e.g., a single housing 410 with a plurality of chambers 422 and a common heating coil 414 surrounding housing 410).

B. Example of Multi-Chamber Staining Module

Figure 7A:
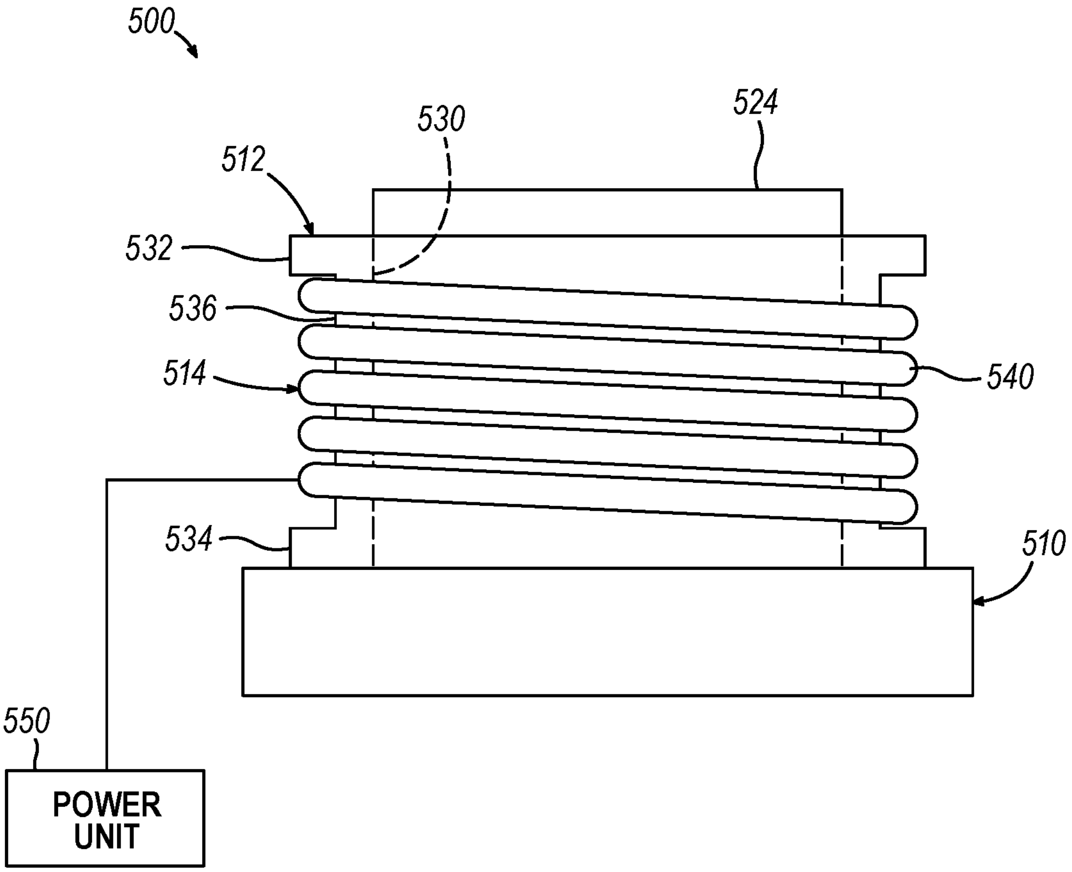
FIG. 7A illustrates a side elevation view of an exemplary multi-chamber staining module for mixing a staining agent with a sample to form a sample mixture, and for incubating the sample mixture.
Figure 7B:
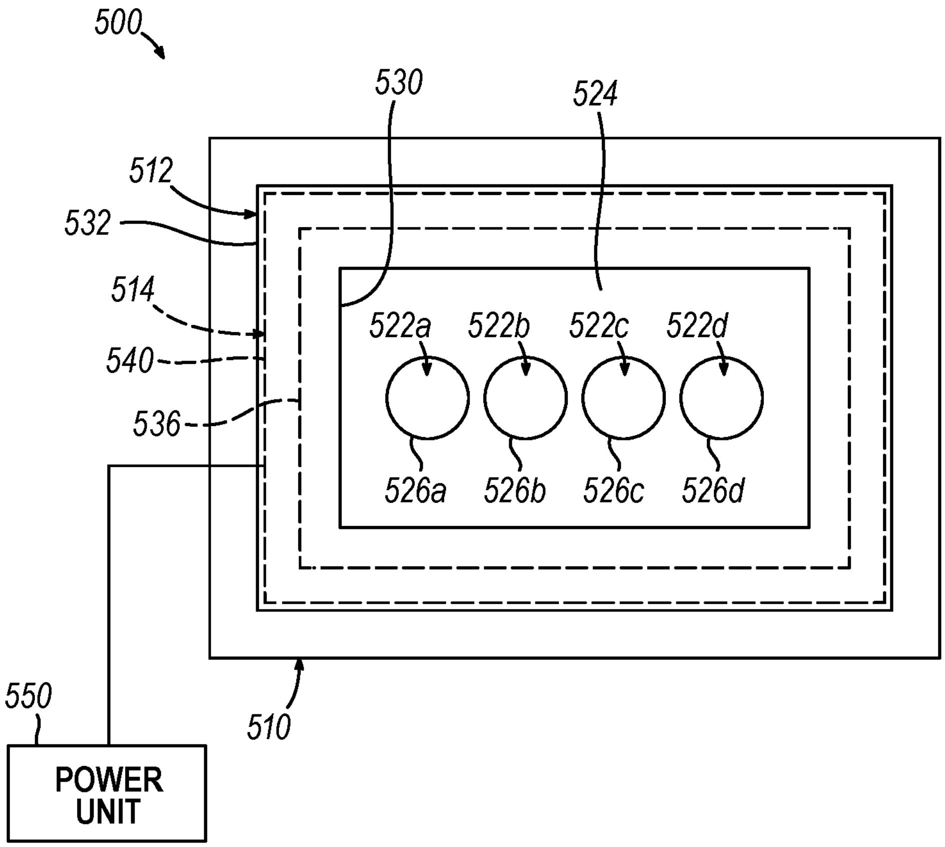
FIG. 7B illustrates a top plan view of the multi-chamber staining module of FIG. 7A.

In a system such as shown in FIG. 1 or FIG. 2, a multi-chamber staining module (also referred to as a staining device) 500 such as shown in FIGS. 7A and 7B may be used to both mix a sample with a staining agent and incubate the sample mixture via induction heating prior to the cells within the sample mixture being imaged by a camera such as the high optical resolution imaging device 24 of FIG. 1, or the image sensor 210 of FIG. 2. For example, the staining module 500 may be incorporated in place of the source 25 shown in FIG. 1 or between the source 25 and the sample feed tube 29 shown in FIG. 1, to facilitate mixing of the sample with the staining agent and incubation of the sample mixture prior to capturing of images of the sample by the high optical resolution imaging device 24. The staining agent may include any suitable composition. For example, the staining agent may be composed in accordance with any one or more teachings of U.S. Pat. No. 9,279,750, entitled "Method and Composition for Staining and Sample Processing," issued on Mar. 8, 2016, the disclosure of which is hereby incorporated by reference in its entirety; and/or U.S. Pat. No. 9,322,753, entitled "Method and Composition for Staining and Processing a Urine Sample," issued on Apr. 26, 2016, the disclosure of which is hereby incorporated by reference in its entirety; and/or US Pub. No. 2021/0108994, entitled "Method and Composition for Staining and Sample Processing," published on Apr. 15, 2021, the disclosure of which is hereby incorporated by reference in its entirety. Note, these staining agents generally describe a staining agent that contains a lysing agent to lyse red blood cells, a permeating agent to permeate white blood cells, a staining element to stain the interior content of white blood cells, a repair element to repair the white blood cells so stain does not escape.

In the embodiment shown, the staining module 500 includes a housing 510, a bracket (also referred to as a sleeve) 512, and a heater in the form of a heating coil 514. The housing 510 includes a plurality of interior chambers 522*a*, 522*b*, 522*c*, 522*d* (also referred to as a sample reservoirs) for receiving the staining agent and the sample, mixing the staining agent and the sample to form a sample mixture, and incubating the sample mixture. The housing 510 also includes a top wall 524 and a plurality of ports 526*a*, 526*b*, 526*c*, 526*d* extending through the top wall 524 to corresponding interior chambers 522*a*, 522*b*, 522*c*, 522*d*. The ports 526*a*, 526*b*, 526*c*, 526*d* may permit a stain dispenser (not shown) to deliver the staining agent to the corresponding interior chambers 522*a*, 522*b*, 522*c*, 522*d*, and/or may permit a sample dispenser (not shown) to deliver the sample to the corresponding interior chambers 522*a*, 522*b*, 522*c*, 522*d* so as to be added to the staining agent. While four interior chambers 522*a*, 522*b*, 522*c*, 522*d* and corresponding ports 526*a*, 526*b*, 526*c*, 526*d* are shown, it will be appreciated that any suitable number of interior chambers 522*a*, 522*b*, 522*c*, 522*d* and corresponding ports 526*a*, 526*b*, 526*c*, 526*d*, such as two, three, or more than four interior chambers 522*a*, 522*b*, 522*c*, 522*d* and corresponding ports 526*a*, 526*b*, 526*c*, 526*d*. In some versions, the first and second interior chambers 522*a*, 522*b* may be configured for use as white blood cell (WBC) chambers 522*a*, 522*b*, while the third interior chamber 522*c* may be configured for use as a red blood cell (RBC) chamber 522*c*.

In some embodiments, the housing 510 may comprise a metallic material having relatively high thermal conductivity, such as aluminum, in order to promote uniform heating of the housing 510 and likewise uniform heating of the contents of the interior chambers 522*a*, 522*b*, 522*c*, 522*d*.

In the embodiment shown, a bracket or sleeve 512 is positioned around the housing 510. The bracket 512 includes an inner bore 530 that is sized and configured to receive at least a portion of the housing 510. In some embodiments, the inner bore 530 may be sized and configured to slidably receive the portion of the housing 510 such that the portion of the housing 510 may be selectively inserted into and/or removed from the inner bore 530. Bracket 512 also includes upper and lower lips 532, 534 defining a recessed region 536 therebetween. The recessed region 536 is sized and configured to accommodate at least a portion of the heating coil 514.

The heating coil 514 includes a wire 540 wound about bracket 512 on the recessed region 536. The wire 540 may comprise a metallic material having relatively high electrical conductivity, such as copper. The wire 540 may have any suitable cross-sectional area and/or thickness, and may be wound to define any suitable number of turns for the heating coil 514. The heating coil 514 is operatively coupled to a power unit 550, which may be configured to drive the heating coil 514 to a frequency at which the heating coil 514 behaves as a resonant circuit that under excitation produces an alternating current thereby producing an alternating magnetic field at or near the heating coil 514, in this way heating coil 514 can act as an inductor and configured as an inductive coil or an inductive heating coil. This field may generate an electromagnetic field (EMF) on the outer surfaces of the housing 510, which may in turn cause an alternating current. This current, in conjunction with the resistivity of the housing 510, may yield power dissipation and heat up the outer surfaces of the housing 510. Such heat may be transferred to the contents of one or more chambers 522*a*, 522*b*, 522*c*, 522*d*, such as the staining agent and/or the sample. It will be appreciated that such induction heating may be performed using relatively low input power, and/or may achieve homogeneous heating of the contents of one or more chambers 522*a*, 522*b*, 522*c*, 522*d* and thereby improve staining and/or lysing performance. In this regard, exciting the circuit at the resonant frequency may deliver maximum power, and exciting the circuit at an increasing frequency may effectively adjust the power delivery.

In some embodiments, bracket or sleeve 512 is composed of a conductive material (e.g., metallic material such as aluminum) to augment heat transfer to the housing and interior surface which receives the blood sample and stain. In some embodiments, bracket or sleeve 512 is composed of a ferromagnetic material. In some embodiments, the bracket or sleeve 512 is not utilized and instead heater/heater coil 514 is mounted directly to an external surface of housing 510.

In some embodiments, a temperature sensor such as a thermistor (not shown) may be configured to continuously sense the temperature of the contents of one or more chambers 522*a*, 522*b*, 522*c*, 522*d*. The temperature sensor may be configured to send feedback signals indicative of the sensed temperatures to a controller (not shown) which may in turn be configured to send control signals to the power unit 550 for selectively driving the heating coil 514. In this manner, the controller may cease heating of the contents of the chamber 522 upon reaching a threshold temperature. In some embodiments, the controller may be configured to send control signals to a maintenance heater (not shown) for maintaining the contents of one or more chambers 522*a*, 522*b*, 522*c*, 522*d* at the threshold temperature.

C. Example of Sample Preparation Process

Figure 8:
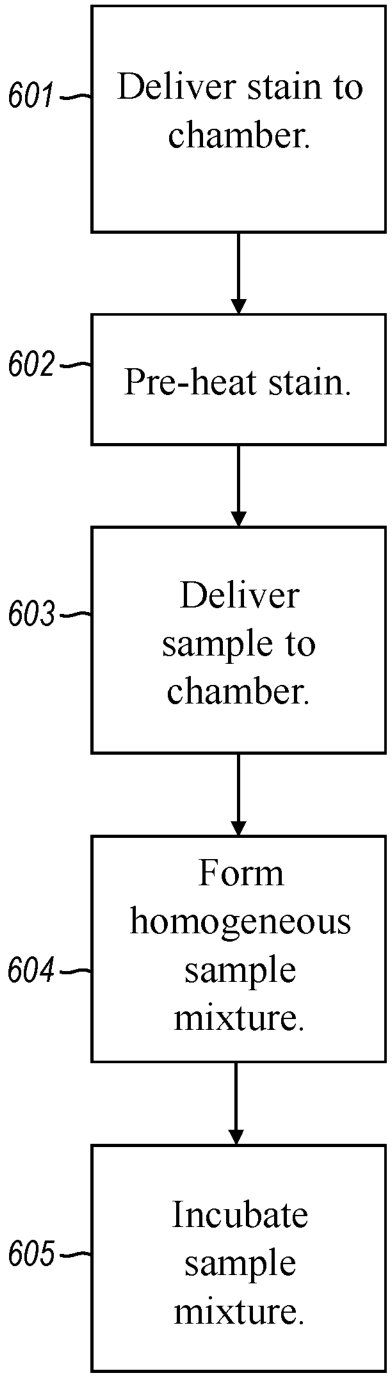
FIG. 8 illustrates a process which may be used to stain a sample.

In a system such as shown in FIG. 1 or FIG. 2, a process such as shown in FIG. 8 may be used to perform sample preparation prior to the cells being imaged by a camera such as the high optical resolution imaging device 24 of FIG. 1, or the image sensor 210 of FIG. 2. Initially, in the process of FIG. 8, the staining agent may be delivered to a chamber, such as the chamber 422 of the staining module 400 shown in FIGS. 6A-6C or one or both WBC chambers 522*a*, 522*b* of the staining module 500 shown in FIGS. 7A-7B, at step 601. This may comprise, for example, delivering the staining agent to the chamber 422, 522*a*, 522*b* through the corresponding port 426, 526*a*, 526*b* via a stain dispenser. The staining agent may then be pre-heated within the chamber 422, 522*a*, 522*b* such as via induction heating, at step 602. Next, the sample may be delivered to the chamber 422, 522*a*, 522*b* at step 603. This may comprise, for example, delivering the sample to the chamber 422, 522*a*, 522*b* through the corresponding port 426, 526*a*, 526*b* via a sample dispenser so as to be added to the staining agent. In some embodiments, the delivery of the sample to the chamber 422, 522*a*, 522*b* may include mixing of the sample with the pre-heated stain within the chamber 422, 522*a*, 522*b*. In the process of FIG. 8, a homogeneous sample mixture may then be formed within the chamber 422, 522*a*, 522*b* at step 604. This may comprise, for example, using fluid energy to mix the sample with the stain, such as by cyclically pulling the sample out of and pushing the sample back into the chamber 422, 522*a*, 522*b* via a corresponding tangential port of the housing 410, 510 to perform a regurgitative mixing. Alternatively, this may comprise using a magnet to drive a spherical ferromagnetic ball placed within the chamber 422, 522*a*, 522*b* to perform an agitative mixing. As another example, this may comprise introducing one or more bubbles at a bottom of the chamber 422, 522*a*, 522*b* to create a vortex.

The homogenous sample mixture may then be heated within the chamber 422, 522*a*, 522*b*, such as via induction heating or resistive heating, at step 605. In some embodiments, the homogeneous sample mixture may be heated to a threshold temperature via induction heating or resistive heating, and may then be maintained at the threshold temperature via a maintenance heater. In embodiments using the multi-chamber staining module 500, it will be appreciated that sample mixtures within both WBC chambers 522*a*, 522*b* may be heated simultaneously via the induction heating, and that any sample within the RBC chamber 522*c* may also be heated via the induction heating (even though such heating of the sample within the RBC chamber 522*c* may not be required prior to imaging), while the fourth chamber 522*d* may remain empty. In some other embodiments using the multi-chamber staining module 500, one or more chambers 522*a*, 522*b*, 522*c*, 522*d*, such as the first WBC chamber 522*a*, may be used for heating a sample mixture while one or more of the other chambers 522*a*, 522*b*, 522*c*, 522*d*, such as the RBC chamber 522*c*, is simultaneously being rinsed; in such cases, increased power may be provided to the heating coil 540 in order to counteract any cooling effect that the rinsing of the RBC chamber 522*c* might otherwise have on the heating of the sample mixture within the first WBC chamber 522*a* (e.g., by adding the same amount of energy lost by such cooling effect).

After the homogenous sample mixture reaches the threshold temperature, the sample mixture may be conveyed to a flowcell, such as the flow cell 22 of FIG. 1 for being imaged by a camera such as the high optical resolution imaging device 24 of FIG. 1. For example, the homogeneous sample mixture may be conveyed directly from the chamber 422, 522*a*, 522*b* to the flow cell 22 (e.g., without undergoing further preparation). It will be appreciated that by heating the sample mixture in the same chamber 422, 522*a*, 522*b* as that in which the sample mixture is formed may improve the throughput of the staining process.

While the formation and induction heating of the sample mixture has been described as occurring within the chamber 422, 522 of the housing 410, 510, it will be appreciated that alternative arrangements may include a tubing having a lumen (not shown) in which the sample mixture may be formed and induction heated in manners similar to those described above. In addition, or alternatively, any one or more of the teachings herein may be combined with any one or more of the teachings disclosed in U.S. Pat. No. 9,429,524, entitled "Systems and Methods for Imaging Fluid Samples," issued on Aug. 30, 2016, the disclosure of which is hereby incorporated by reference in its entirety.

In some embodiments, the addition of diluent is part of the preparation step, where the diluent is added to each chamber 522*a*-522*d* during before, after, or both before and after a blood sample is added to each chamber. For example, an RBC chamber can receive diluent as the primary or sole preparation reagent, while a WBC chamber can receive both diluent and stain.

It should be appreciated that the preparation step for RBC chambers can be different than WBC chambers. For instance, the RBC chambers would utilize a preparation step involving: a) receiving a diluent followed by a blood sample, b) receiving a blood sample followed by a diluent, or c) receiving a diluent, followed by a blood sample, followed by additional diluent; but would not receive a stain. In this way, the preparation time for the RBC chambers may be shorter and a workflow can involve running an RBC sample through an imaging process while the WBC samples are still being prepared.

In some embodiments, a staining reagent utilizes both a lysing agent (to lyse red blood cells) and a staining agent (to permeate the remaining white blood cells, stain the interior region, and repair the white blood cell so stain does not escape). In this way, a single staining reagent can be used to process certain types of cells (e.g., white blood cells) to both eliminate red blood cells and stain the remaining white blood cells. Other embodiments can utilize a plurality of compositions, for instance a first lysing reagent to lyse red blood cells, and a second staining reagent to stain white blood cells, where a workflow would involve a chamber (e.g., a WBC chamber) receiving a separate lysing reagent and a separate staining reagent to prepare WBC samples for visualization.

In some embodiments, the various chambers (e.g., 522*a*-522*d*) are not meant to strictly prepare dedicated cell types, or in other words can rotate cell types. For instance, the chambers can alternate being used for RBC and WBC preparation. In this manner, once the samples in the chambers are prepped an image, a cleaning cycle can be utilized to clean the chambers before receiving a subsequent blood sample (e.g., chamber 522*a* can first be configured to prepare WBC's for a certain amount of same preparation runs, then RBC's for a certain amount of sample preparation runs—for instance 1 WBC preparation followed by 1 RBC preparation, or 2 WBC preparations followed by 1 RBC preparation followed by 2 more WBC preparations, etc). A cleaning reagent, such as diluent or cleaner, can be used between sample runs to eliminate carryover. Even in circumstances where a particular chamber is solely used for a particular cell type (e.g., 522*a* used solely as a WBC chamber), there can be a cleaning step run after a sample is prepared and imaged in order to eliminate carryover.

Other embodiments can still utilize multiple stains as part of the preparation process. For instance, a first stain configured to stain white blood cells in the manner described herein, and a second stain configured to stain at least one of platelets or reticulocytes. These staining compositions can be used uniquely in various workflows. For instance, a first chamber of housing 410, 510 can be used to prepare a white blood cell sample that comprises receiving at least a WBC stain and lyse reagent, while a second chamber of housing 410, 510 can be used to prepare a platelet sample—this chamber would receive at least a platelet reagent—different than the WBC stain and lyse reagent.

Please note, though the term White blood cell (WBC) chamber and Red blood cell (RBC) chamber is used to denote the sample preparation chambers for imaging, the samples imaged as a result of the preparation process can allow for biological imaging of a plurality of cell types. For instance, the WBC chambers utilize a lyse to eliminate red blood cells, however the lyse may still retain platelets and reticulocytes, so the sample prepared in the WBC chamber can still image at least white blood cells, platelets, and reticulocytes—for instance. Similarly, the RBC chambers may receive a different preparation procedure than the WBC chambers (e.g., no lyse, or no stain/lyse combined reagent), but the sample prepared in the RBC chamber can still visualize a plurality of cell types, such as red blood cells—and one or more of white blood cells, platelets, and reticulocytes.

IV. Example of Flowcell Holder

Figure 9:
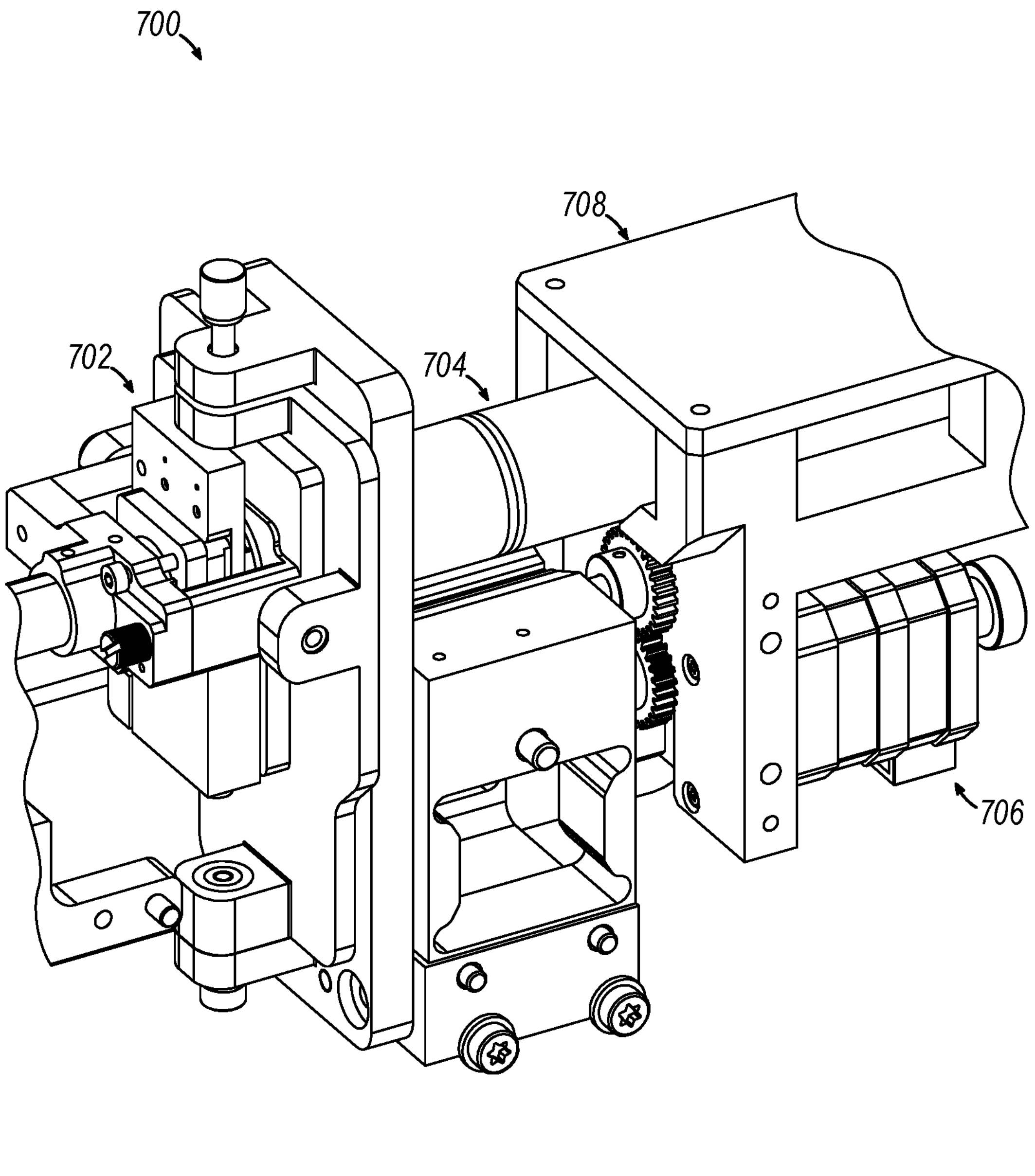
FIG. 9 illustrates a perspective view of an exemplary flowcell holder in conjunction with another exemplary flowcell and high optical resolution imaging device for sample image analysis using digital image processing.
Figure 10:
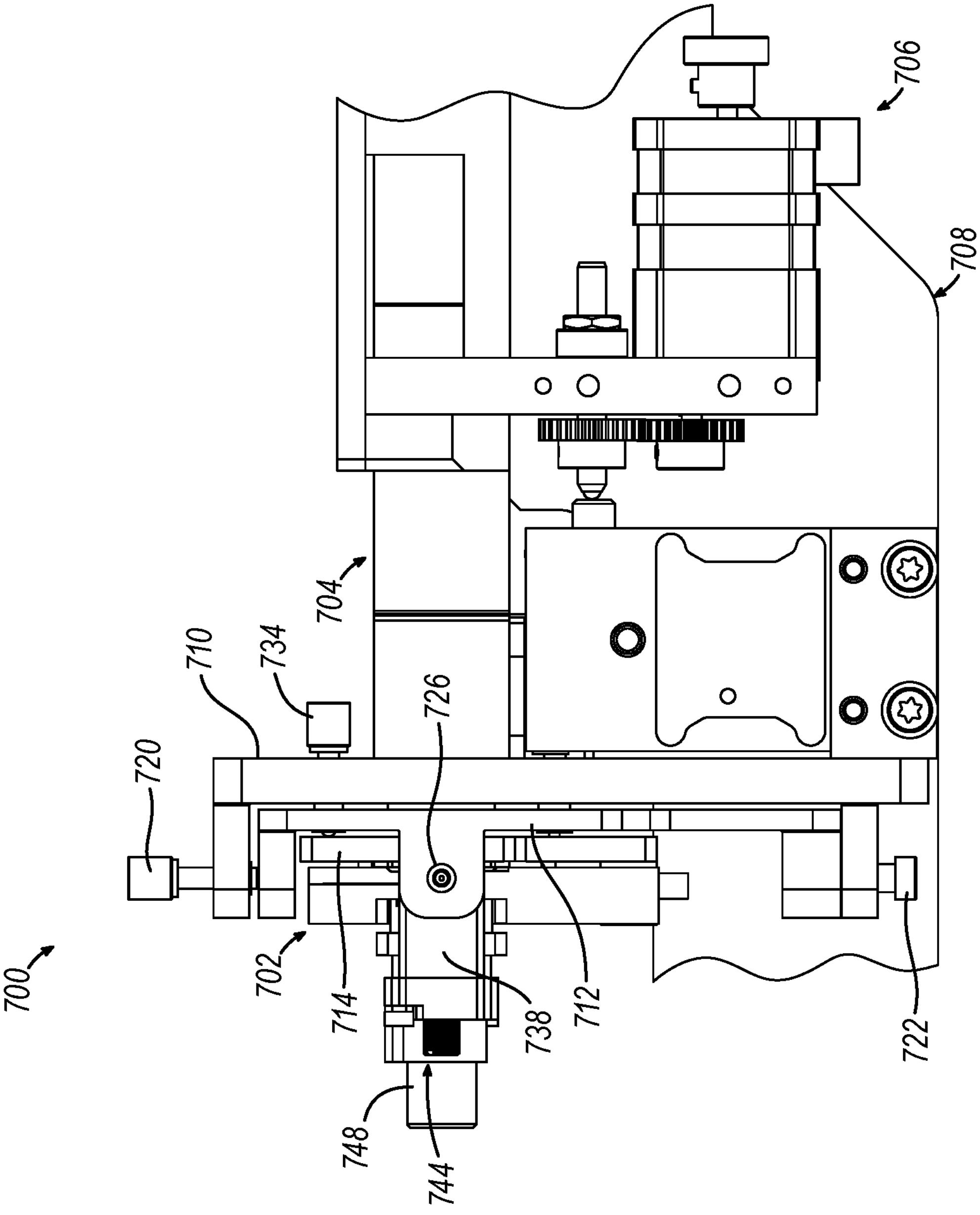
FIG. 10 illustrates a side elevation view of the flowcell holder, flowcell, and high optical resolution imaging device of FIG. 9.

In a system such as shown in FIG. 1 or FIG. 2, a flowcell holder (also referred to as a flowcell stage or flowstage) 700 such as shown in FIGS. 9-15 may be used to facilitate imaging of cells by a camera such as the high optical resolution imaging device 24 of FIG. 1, or the image sensor 210 of FIG. 2. For example, the flowcell holder 700 may be used to adjustably support the flowcell 22 shown in FIG. 1. FIG. 9 shows the flowcell holder 700 in conjunction with an exemplary flowcell 702, which may be configured and operable like the flow cell 22 shown in FIG. 1, as well as a high optical resolution imaging device 704, which may be configured and operable like the high optical resolution imaging device 24 shown in FIG. 1. The flowcell holder 700 and the flowcell 702 may collectively define a flowcell apparatus. As shown in FIGS. 9-10, the flowcell holder 700 is operatively mounted to an output drive of a motor 706 so as to be precisely movable toward and away from the high optical resolution imaging device 704, which may be fixedly mounted to a frame 708 so as to be stationary. While not shown, a lighting module may be positioned on a side of the flowcell 702 opposite the high optical resolution imaging device 704 for illuminating an analysis region such as a viewing zone (also referred to as an image capture region or an imaging region) of the flowcell 702 as a sample moves through the analysis region to facilitate the capturing of images of the sample by the high optical resolution imaging device 704. Such a lighting module may be configured and operable just like lighting module 300 described above, for example. In some embodiments, the flowcell 702 may be the same as the flowcell 302 described above, and/or the high optical resolution imaging device 704 may be the same as the high optical resolution imaging device 304 described above. In the embodiment shown, the flowcell 702 includes a first portion **702*a* constructed of a first material, such as plastic (e.g., acrylic), and a second portion 702*b* (FIGS. 13-14) constructed of a second material different from the first material, such as glass or sapphire glass. The glass portion 702*b* may define the analysis region of the flowcell 702, while the plastic portion 702*a* may define a non-analysis region of the flowcell 702**.

Figure 11:
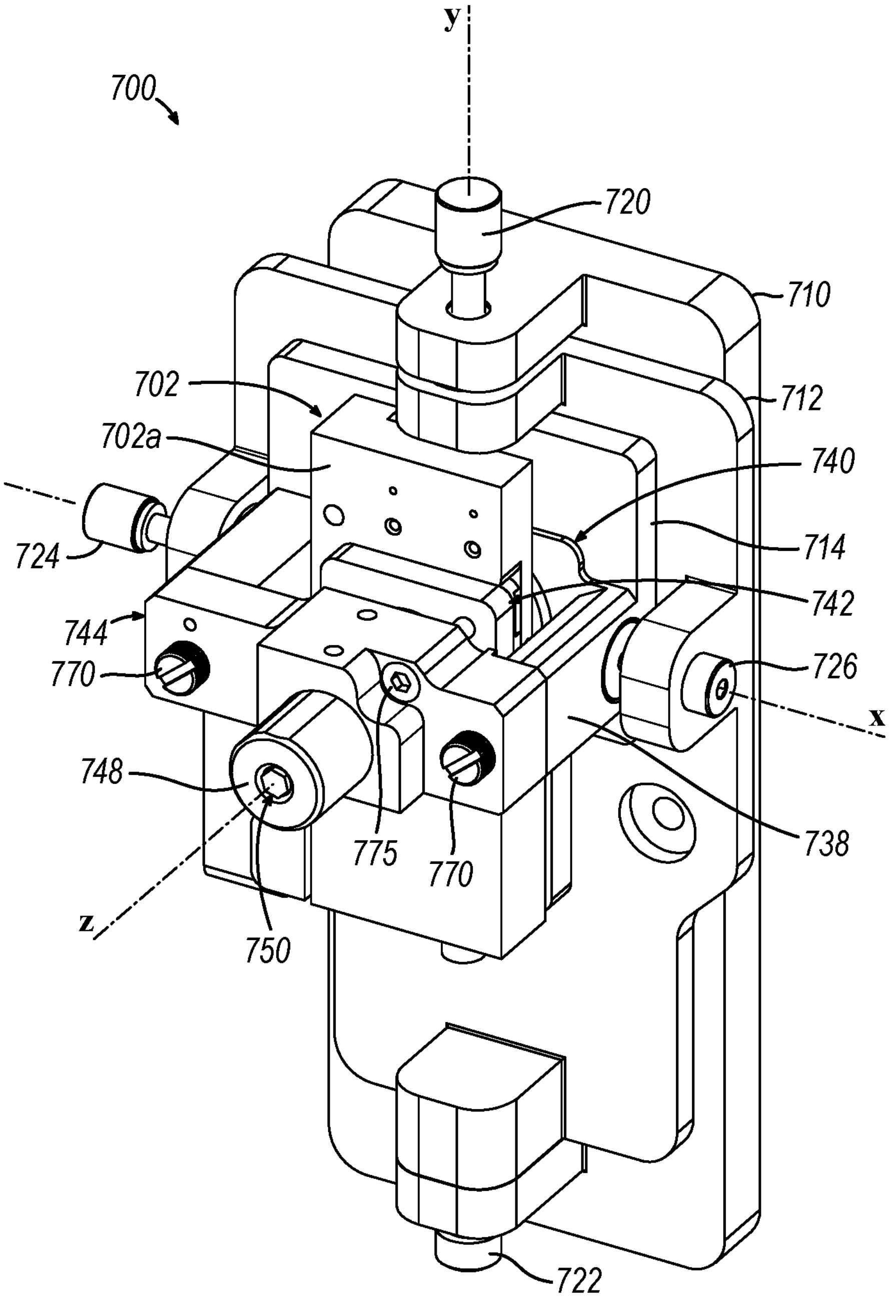
FIG. 11 illustrates a perspective view of the flowcell holder and flowcell of FIG. 9.
Figure 12:
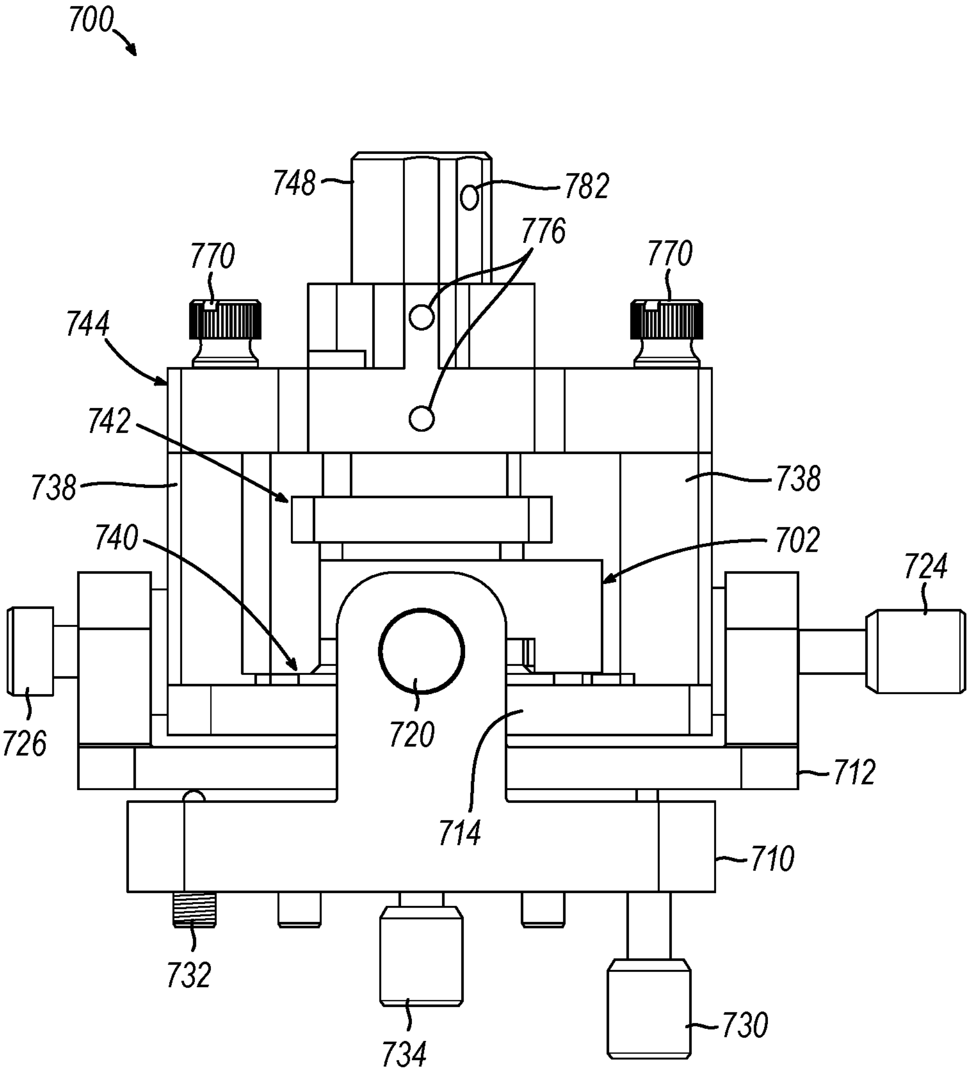
FIG. 12 illustrates a top plan view of the flowcell holder and flowcell of FIG. 9.

As best shown in FIGS. 11-12, the flowcell holder 700 includes a stage plate 710, a first gimbal 712, and a second gimbal 714. The stage plate 710 is operatively coupled to the motor 706 to facilitate translation of the stage plate 710 along an optical axis of the high optical resolution imaging device 704, also referred to as the z-axis. The first gimbal 712 is movably coupled to the stage plate 710 to facilitate yawing of the first gimbal 712 about a vertical axis orthogonal to the optical axis of the high optical resolution imaging device 704, also referred to as the y-axis, and/or to facilitate translation of the first gimbal 712 along the y-axis. The second gimbal 714 is pivotably coupled to the first gimbal 712 to facilitate pitching of the second gimbal 714 about a horizontal axis orthogonal to the optical axis of the high optical resolution imaging device 704, also referred to as the x-axis, and/or to facilitate translation of the second gimbal 714 along the x-axis.

More particularly, the first gimbal 712 is movably coupled to the stage plate 710 via a vertical adjustment screw 720 and a corresponding spring-loaded plunger 722, such that downward advancement of the vertical adjustment screw 720 may translate the first gimbal 712 downwardly along the y-axis and such that upward retraction of the vertical adjustment screw 720 may translate the first gimbal 712 upwardly along the y-axis. Similarly, the second gimbal 712 is movably coupled to the first gimbal 712 via a horizontal adjustment screw 724 and a corresponding spring-loaded plunger 726, such that rightward advancement of the lefthand screw 724 may translate the second gimbal 714 rightwardly along the x-axis and such that leftward retraction of the lefthand screw 724 may translate the second gimbal 714 leftwardly along the x-axis.

As best shown in FIG. 12, a yaw adjustment screw 730 and a corresponding spring-loaded plunger 732 extend through the stage plate 710 for engaging a rear surface of the first gimbal 712 on opposite sides of the y-axis, such that forward advancement of the yaw adjustment screw 730 may yaw the first gimbal 712 counterclockwise about the y-axis and such that rearward retraction of the yaw adjustment screw 730 may yaw the first gimbal 712 clockwise about the y-axis. Similarly, a pitch adjustment screw 734 and a corresponding spring-loaded plunger (not shown) extend through both the stage plate 710 and the first gimbal 712 for engaging a rear surface of the second gimbal 714 on opposite sides of the x-axis, such that forward advancement of the pitch adjustment screw 734 may pitch the second gimbal 714 counterclockwise about the x-axis and such that rearward retraction of the pitch adjustment screw 734 may pitch the second gimbal 714 clockwise about the x-axis.

In the embodiment shown, the second gimbal 714 includes a pair of forwardly-extending support arms 738, the purposes of which are described below.

Figure 13:
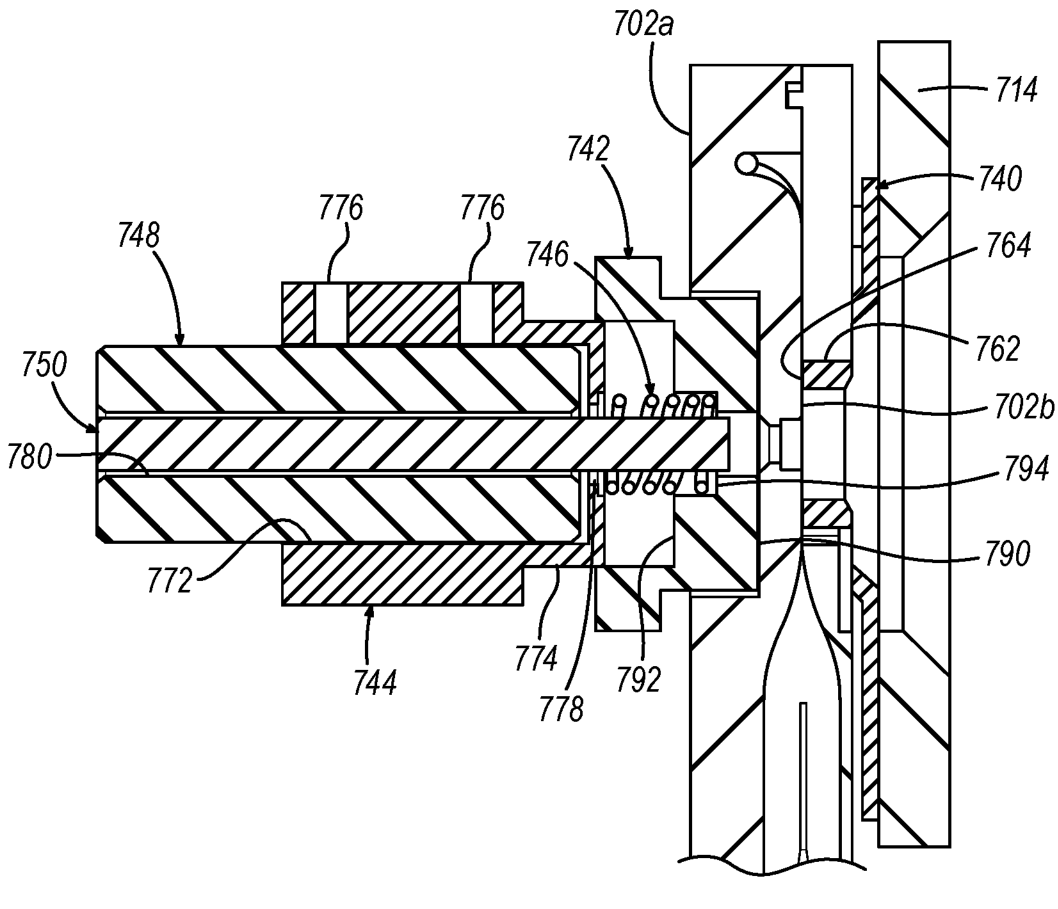
FIG. 13 illustrates a cross-sectional view of a subassembly of the flowcell holder and flowcell of FIG. 9.
Figure 14:
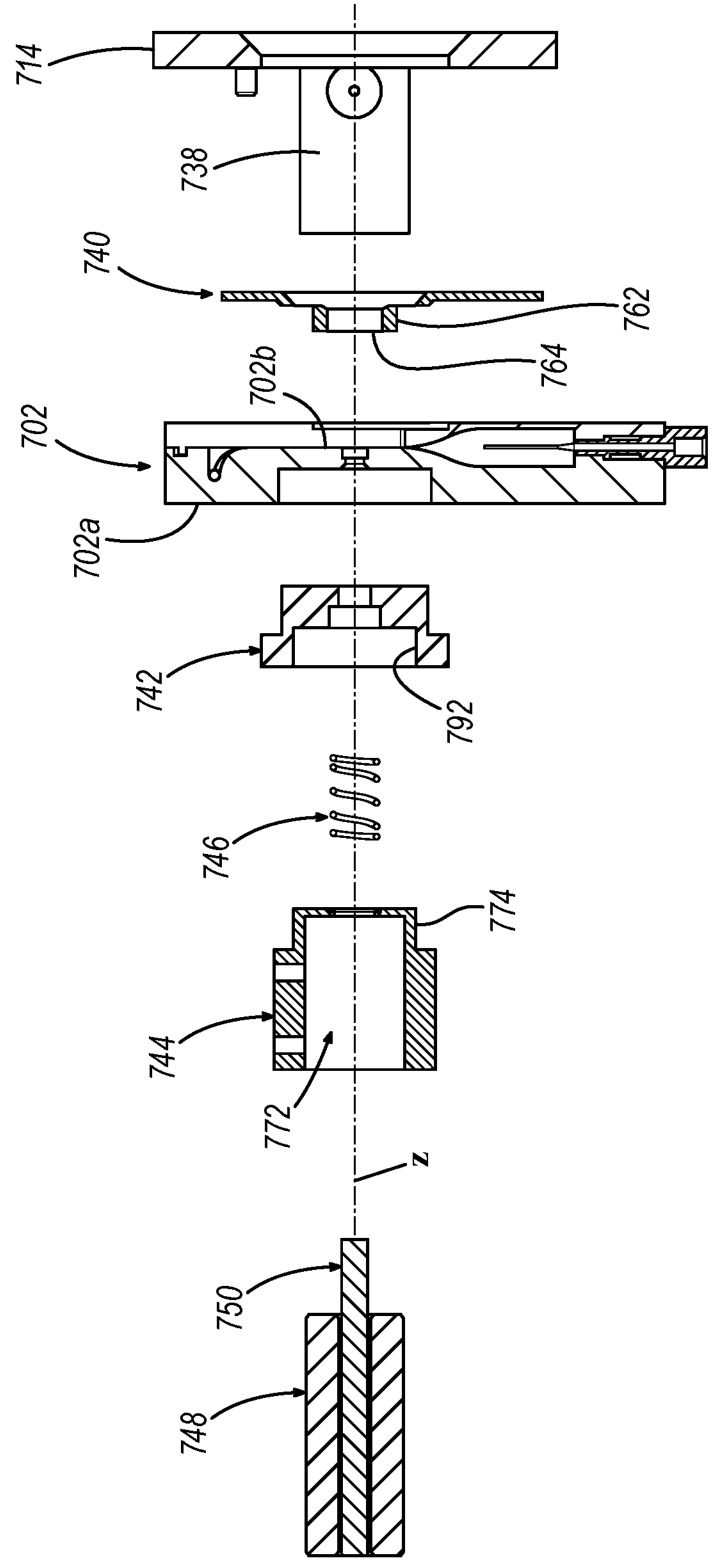
FIG. 14 illustrates an exploded cross-sectional view of the subassembly of FIG. 13.
Figure 15:
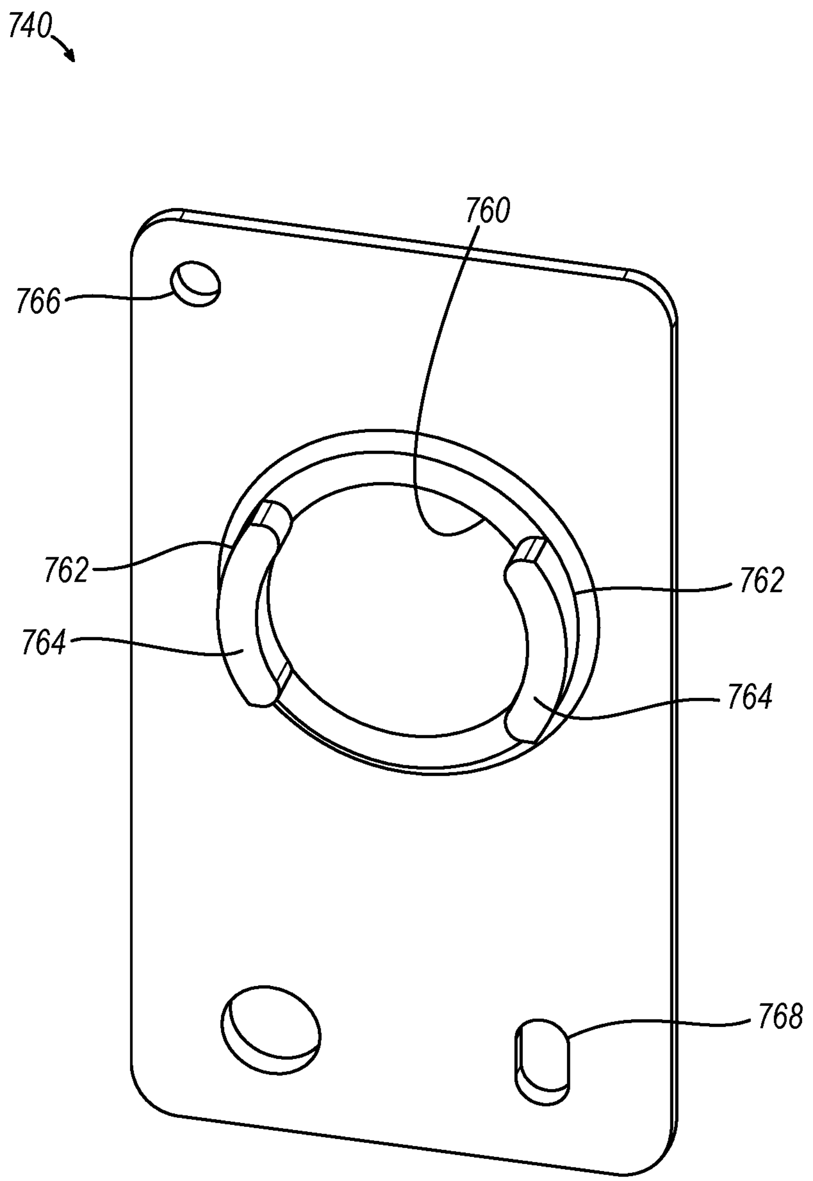
FIG. 15 illustrates a perspective view of an adapter plate of the subassembly of FIG. 13.

Referring now to FIGS. 13-15, and with continuing reference to FIGS. 11-12, the flowcell holder 700 of the embodiment shown further includes an adapter plate (also referred to as a connector) 740, a fixation block 742, a mounting bracket 744, a compression spring 746 in the form of a coil spring, and a lightpipe retention member 748 configured to securely retain a lightpipe (also referred to as a lighting column or a lightguide) 750. The lightpipe 750 may be configured to convey light from a lighting module (not shown), such as lighting module 300, to the analysis region of the flowcell 702. The lightpipe 750, in one embodiment, randomizes the light received at a first end of the lightpipe 750 (the end closer to the lighting module 300, which produces a light as described earlier), where the randomized light is then projected at a second end of the lightpipe 750 (the end closer to the flowcell 702) to illuminate an imaging region of the flowcell 702. The distance between the lightpipe 750 and flowcell 702 is important to create a similar illumination profile regardless of positioning of the flowcell 702 (via the flowcell holder 700), in this way it is important to keep this distance fixed or as close to fixed as possible. By positioning the lightpipe 750 as part of the flowcell holder assembly 700, this ensures operable connection with the flowcell 702, and ensures the distance between the lightpipe 750 and the flowcell 702/imaging region of the flowcell 702 stays constant to ensure this consistent illumination profile.

As best shown in FIG. 15, the adapter plate 740 includes a circular bore 760 and a pair of forwardly-extending arcuate ridges 762 positioned on opposite sides of the bore 760. The arcuate ridges 762 include respective forwardly-facing engagement surfaces 764 configured to frictionally engage a corresponding portion of the flowcell 702. For example, the engagement surfaces 764 may be configured to frictionally engage a rear surface of the flowcell 702 (e.g., that faces toward the high optical resolution imaging device 704). More particularly, the engagement surfaces 764 may be configured to frictionally engage the rear surface of the glass portion 702*b* of the flowcell 702 that defines the analysis region, on opposite sides of the y-axis from each other and thus on opposite sides of a flowpath of the flowcell 702. Thus, the engagement surfaces 764 may define a mounting plane along which the rear surface of the glass portion 702*b* the flowcell 702 contacts the flowcell holder 700.

As described in greater detail below, the flowcell 702 may be sandwiched between the arcuate ridges 762 and the fixation block 742 to thereby secure the flowcell 702 to the flowcell holder 700, with the engagement surfaces 764 of the arcuate ridges 762 abutting the rear surface of the glass portion 702*b* of the flowcell 702 that defines the analysis region. It will be appreciated that the glass portion 702*b* of the flowcell 702 may have a relatively low thermal expansion coefficient, at least by comparison to that of the plastic portion 702*a* of the flowcell 702. In addition, the material thickness between the flowpath of the flowcell 702 and the rear surface of the glass portion 702*b* of the flowcell 702 may be substantially less than the material thickness between the flowpath of the flowcell 702 and the rear surface of the plastic portion 702*a* of the flowcell 702. Thus, by securing the rear surface of the glass portion 702*b* of the flowcell 702 against the engagement surfaces 764, the risk of the viewing zone of the flowcell 702 moving out of focus in response to temperature changes may be substantially mitigated or eliminated. In some embodiments, the adapter plate 740 may comprise a metallic material having a relatively low thermal expansion coefficient, such as aluminum, to further mitigate the risk of the viewing zone of the flowcell 702 moving out of focus in response to temperature changes. Due to the positioning of the engagement surfaces 764 of the arcuate ridges 762 on opposite sides of the flowpath of the flowcell 702, the engagement surfaces 764 do not bridge across the flowpath (e.g., extend over or under the flowpath) such that the engagement surfaces 764 may avoid applying pressure to the flowcell 702 along the flowpath.

As shown in FIG. 15, the adapter plate 740 includes an alignment bore 766 and an alignment slot 768 configured to align with corresponding alignment bores and slots (not shown) of the flowcell 702 and/or to receive respective alignment pins (not shown) of the second gimbal 714 therethrough, for promoting proper alignment of the adapter plate 740 relative to the flowcell 702 and/or the second gimbal 714.

In the embodiment shown, the mounting bracket 744 is affixed to the support arms 738 of the second gimbal 714 via corresponding screws 770. As best shown in FIGS. 13-14, the mounting bracket 744 includes an internal cavity 772 sized and configured to securely receive the lightpipe retention member 748, and a generally annular collar portion 774 configured to slidably support the fixation block 742, as described in greater detail below. In some embodiments, the fixation block 742 may be movably coupled to the mounting bracket 744, such as via one or more screws 775. As shown, a pair of threaded bores 776 are provided through an upper portion of the mounting bracket 744 for receiving corresponding set screws (not shown), which may apply pressure against the lightpipe retention member 748 when situated within the cavity 772 to inhibit inadvertent movement of the lightpipe retention member 748 relative to the mounting bracket 744. The mounting bracket 744 of the embodiment shown also includes a generally annular shoulder 778 sized and configured such that a forward end of the compression spring 746 may be seated against the shoulder 778, as described in greater detail below.

The lightpipe retention member 748 includes a longitudinal bore 780 extending along the z-axis that is sized and configured to securely receive the lightpipe 750 while also aligning the lightpipe 750 with the analysis region of the flowcell 702 and positioning an exit of the lightpipe 750 substantially proximate to the analysis region. As shown, at least one threaded bore 782 (FIG. 12) is provided through an upper portion of the lightpipe retention member 748 for receiving a corresponding set screw (not shown), which may apply pressure against the lightpipe 750 when situated within the bore 780 to inhibit inadvertent movement of the lightpipe 750 relative to the lightpipe retention member 748. In this manner, the lightpipe 750 may be securely mounted or otherwise connected to the flowcell holder 700 such that the exit of the lightpipe 750 may be fixedly secured relative to the flowcell 702, to thereby promote proper illumination of the analysis region of the flowcell 702 via the lightpipe 750 and inhibit the exit of the lightpipe 750 from inadvertently becoming misaligned or otherwise moved away from the analysis region of the flowcell 702. For example, the position of the lightpipe 750 relative to the flowcell 702 (e.g., the distance between the exit of the lightpipe 750 and the flowcell 702) may remain fixed during adjustment of the position and/or orientation of the flowcell 700 via the motor 706, the vertical adjustment screw 720, the horizontal adjustment screw 724, the yaw adjustment screw 730, and/or the pitch adjustment screw 734. As described above and herein, this fixed position of the lightpipe 750 relative to flowcell 702 is important to ensure consistent illumination and imaging quality of the biological sample.

The fixation block 742 includes a generally annular rearwardly-facing engagement surface 790 configured to frictionally engage a corresponding portion of the flowcell 702 opposite the engagement surfaces 764 of the arcuate ridges 762 of the adapter plate 740 to sandwich the flowcell 702 therebetween. In this regard, the fixation block 742 also includes a generally annular recess 792 configured to slidably receive the collar portion 774 of the mounting bracket 744, and a generally annular shoulder 794 sized and configured such that a rearward end of the compression spring 746 may be seated against the shoulder 794. Thus, the compression spring 746 may be configured to urge the fixation block 742 in a rearward direction along the z-axis for promoting the frictional engagement between the engagement surface 790 of the fixation block 790 and the corresponding portion of the flowcell 702, as well as the frictional engagement between the engagement surfaces 764 of the arcuate ridges 762 of the adapter plate 740 and the corresponding portions of the flowcell 702 to securely sandwich the flowcell 702 between the fixation block 742 and the adapter plate 740.

In some embodiments, the fixation block 742 may slide slightly along the collar portion 772 of the mounting bracket 744, such as in a forward direction along the z-axis to accommodate thermal expansion of the flowcell 702 (e.g., of the plastic portion 702*a*) along the z-axis. In such cases, it will be appreciated that the compression spring 746 may be configured to maintain the frictional engagement between the engagement surface 790 of the fixation block 790 and the corresponding portion of the flowcell 702, as well as the frictional engagement between the engagement surfaces 764 of the arcuate ridges 762 of the adapter plate 740 and the corresponding portions of the flowcell 702.

While the arcuate ridges 762 of the embodiment described above are incorporated into the adapter plate 740 which is secured to the second gimbal 714, the arcuate ridges 762 including their respective engagement surfaces 764 may alternatively be incorporated directly into the second gimbal 714.

Figure 16:
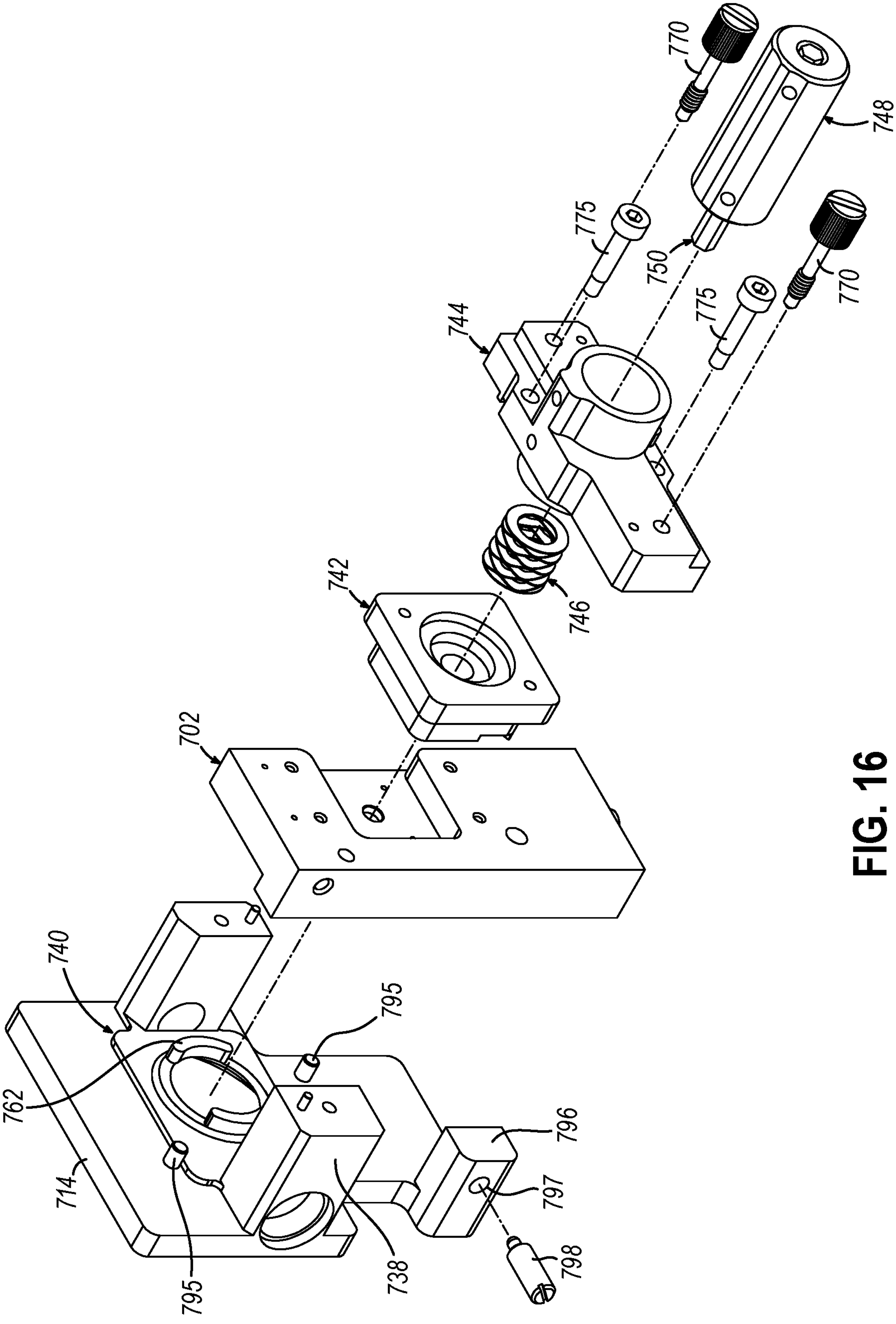
FIG. 16 illustrates an exploded perspective view of an alternative arrangement of the subassembly of FIG. 13.

In this regard, FIG. 16 shows an alternative arrangement in which the adapter plate 740 is integrally formed together with the second gimbal 714 as a unitary (e.g., monolithic) piece. In the arrangement shown in FIG. 16, the compression spring 746 is provided in the form of a wave disc.

In the embodiment shown, the second gimbal 714 also includes a pair of forwardly-extending alignment pins 795 configured to be received withing corresponding alignment bores and/or slots (not shown) of the flowcell 702, for promoting proper alignment of the second gimbal 714 relative to the flowcell 702. As shown, the second gimbal 714 further includes a forwardly-extending stabilizing arm 796 with a threaded bore 797 extending therethrough for receiving a spring-loaded plunger 798. The spring-loaded plunger 798 may be configured to apply pressure against a side of the flowcell 702 to reduce or eliminate any mechanical play that may otherwise exist between the alignment pins 795 of the second gimbal 714 and the corresponding alignment bores and/or slots of the flowcell 702.

While the stage plate 710 of the embodiment described above is operatively mounted to the output drive of the motor 706 to facilitate translation of the stage plate 710 along the z-axis (i.e., the optical axis of the high optical resolution imaging device 704) such that the flowcell holder 700 is precisely movable toward and away from the high optical resolution imaging device 704, such relative movement may be provided in any other suitable manner.

Figure 17:
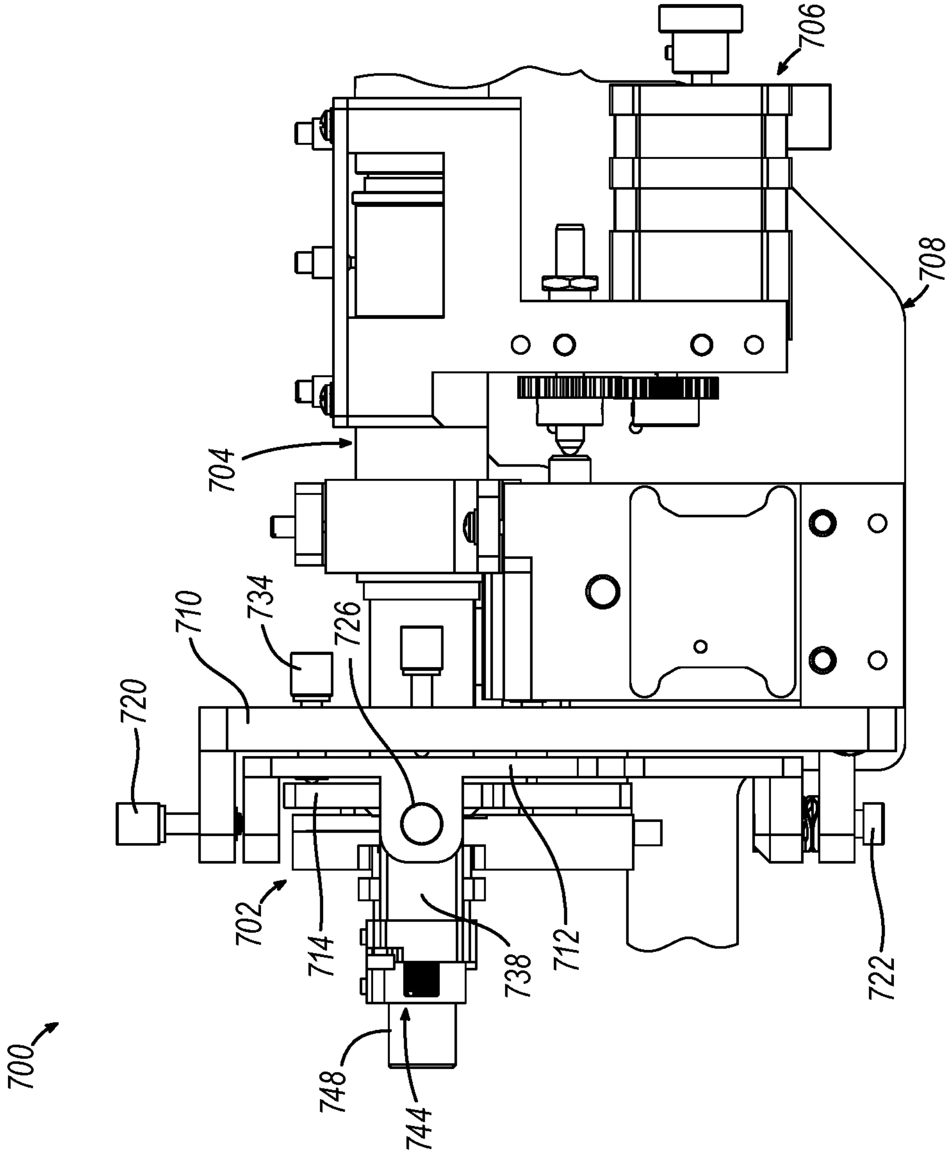
FIG. 17 illustrates a side elevation view of an alternative arrangement of the flowcell holder, flowcell, and high optical resolution imaging device of FIG. 9.

In this regard, FIG. 17 shows an alternative arrangement in which the stage plate 710 is fixedly mounted to the frame 708 so as to be stationary, and in which at least a portion of the high optical resolution imaging device 704, such as the objective lens thereof, is operatively mounted to the output drive of the motor 706 to facilitate translation of the objective lens of the high optical resolution imaging device 704 along the z-axis (i.e., the optical axis of the high optical resolution imaging device 704) such that at least the objective lens of the high optical resolution imaging device 704 is precisely movable toward and away from the flowcell holder 700.

V. Additional Exemplary System Features

In a system such as shown in FIG. 1 or FIG. 2, various additional features may be implemented in addition to or as an alternative to any one or more of the features described above, as described in greater detail below.

A. Example of LED Driver

In some instances, a light source driver in the form of an electronic circuit may be designed to drive high slew rate electrical current pulses through LED light sources (e.g., similar to light emitters 312*a*, 312*b*, 312*c*) to produce an electrical current and a modulated light pulse. The pulse time duration of the pulse may be controlled so as to produce a range of pulse widths between about 1 μs and about 10 μs, or greater as needed to control the imager exposure time. The light pulses may be used to control the image capture exposure time so that sharp images of the cells or the particles in motion may be obtained. To allow for the acquisition of images of blood cells, latex beads, particles, crystals, bubbles, debris and a wide range of particles flowing at high velocity through a flow cell, with the intent of illuminating the particles with enough speed to capture images that are not blurred. The repetition rate of the light pulses may be increased by increasing the triggering rate as needed from less than about 1 Hz to greater than about 1 KHz to allow for the acquisition of enough image throughput. The light source characteristics may allow for discrimination of fine detail in contrast, internal particle contents, accurate color rendition, tunable color spectrum adjustment by means of DAC interfacing and illumination power control of all light sources to provide an infinite variety of color combinations. The light source may allow for optimal focusing performance by the optics and the digitizing imager.

The LED illumination may be coupled through optical means including, for example, mirrored surface parabolic light reflector, optical fiber bundle, solid optical light guide, optical fiber cable, bifurcated optical fiber bundle, condenser lens, optical guide with internal mirror, optical prism so as to guide, shape and couple the pulsed illumination from the LED to the viewing window of a flow cell where the particles, cells or other microscopically viewable objects are moving in an organized area for imaging. Filters to be used to optimize the interrogation spectrum illuminating the flow cell and the sample stream within it. A hexagonal homogenizer pipe may be implemented to provide interface between the illumination source, and to randomize the light rays that are coupling to the flow cell. A brightfield illumination may be implemented at the imaging digitizer.

In this regard, a capacitive discharge circuit with synchronizing trigger input may be provided. Functional submodules include power conditioning of input voltages; input voltage pre-regulator; discharge capacitor regulator; discharge capacitor bank; discharge capacitor voltage regulator; trigger pulse generator; capacitive discharge transistor; delay timers; interfacing signals; DC power for discharge capacitor bank; DC power for logic; DC power for analog devices; communication interface with addressing for discharge voltage control; discharge trigger signal; gate driver disable/enable signal; delay timer disable/enable signals; and/or discharge capacitor low inductance interface.

The rise and fall times below of the current pulses may be kept bellow 250 ns so that the modulated light pulses may illuminate and extinguish so as to generate a symmetrical, and square pulse. These rise and fall times may allow the total duration of the light pulse to produce useful light pulses greater than about 1 μs in duration width. Low ESL charge/discharge capacitors may be desired to obtain the fast-rising edge pulses. Low inductance through the complete LED electrical current path may be desired in order to obtain the fast-rising edge pulses. Low ESR capacitor may be implemented in the capacitive discharge circuit to avoid power losses and heating of the capacitor. The illumination device may feature an enable signal with the intent of operating the light source during the imaging phase of the system operation and disabling when the system is idle. The white LED may be of the high CRI type in order to reproduce accurate colors by the imaging system. An optical diffuser with a wide angle may be used between the LED and the optical light guide, or optical fiber, or parabolic reflector, or elliptical reflector in order to diffuse the LED illumination in such a way that shadows are reduced in the images. A color filter may be used in order to optimize the color response of the LED illumination in such a way that excess blue light is suppressed to provide even colors through the visible light spectrum. A condenser lens may be used to couple the LED illumination to match the numerical aperture to a variety of objectives lenses with varying numerical apertures. The electronic control circuit may feature voltage regulation to control the voltage across the discharge capacitor and a result control the charge across the capacitor and as a result control the LED illumination power input, and the light intensity. The electronic circuit may feature pulse width control and as a result the light pulse time may be controlled, and the light pulse may be controlled. In the multiple LED configuration timers may be implemented to add time delays between the multiple LED flashes and provide the system with the ability to measure particle or cell velocity, provided with the known time delay between flashes.

B. Examples of Two-Cube Beam-Splitter RGB LED Combiner

Figure 18:
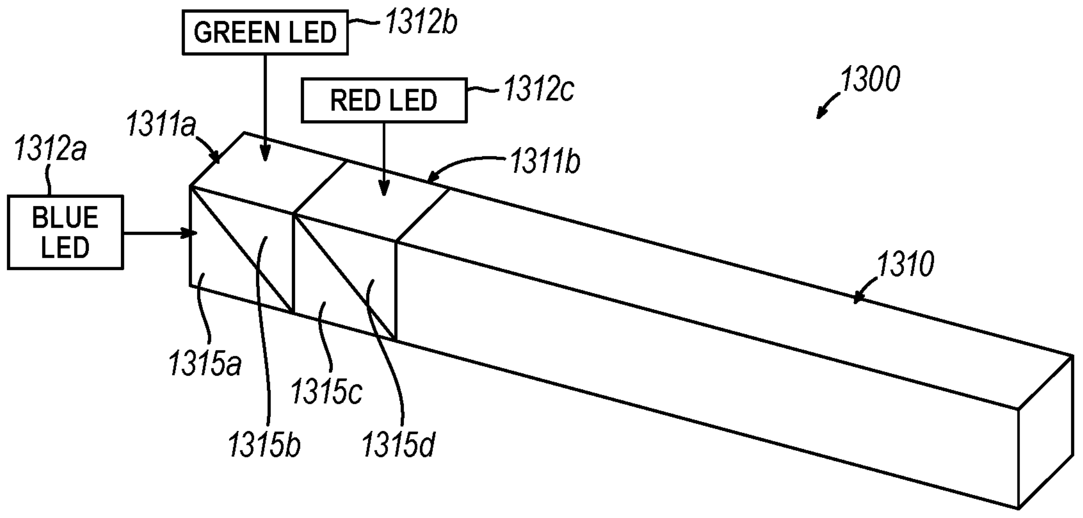
FIG. 18 illustrates a perspective view of another exemplary lighting module.

FIG. 18 shows an example of another lighting module 1300 that may be readily incorporated into a system such as shown in FIG. 1 or FIG. 2 in place of the lighting module 300 described above. In the example shown, the lighting module 1300 includes a rectangular glass lightpipe 1310, a pair of cube beam splitters 1311*a*, 1311*b*, and a plurality of light emitters 1312*a*, 1312*b*, 1312*c*. The light emitters 1312*a*, 1312*b*, 1312*c* may each be any suitable light source including, for example, a light emitting diode (LED), or any other suitable light emitter for providing either pulsed or continuous illumination. In some embodiments, the light emitters 1312*a*, 1312*b*, 1312*c* may each be configured to emit a light of a different color than the other light emitters 1312*a*, 1312*b*, 1312*c*. For example, the first light emitter 1312*a* may include a blue LED configured to emit blue light having a wavelength of between about 400 nanometers and about 470 nanometers, such as about 450 nanometers; the second light emitter 1312*b* may include a green LED configured to emit green light having a wavelength of between about 470 nanometers and about 600 nanometers, such as about 525 nanometers; and/or the third light emitter 1312*c* may include a red LED configured to emit red light having a wavelength of between about 600 nanometers and about 650 nanometers, such as about 620 nanometers.

Each cube beam splitter 1311*a*, 1311*b* may comprise a corresponding pair of right angle prisms 1315*a*, 1315*b*, 1315*c*, 1315*d*. Each beam splitter 1311*a*, 1311*b* may be coated with band pass dichroic coatings, which reflect one color efficiently, but also transmit other colors with high efficiency. In this regard, the first beam splitter 1311*a* may be coated with a green light reflecting dichroic coating, while the second beam splitter 1311*b* may be coated with a red light reflecting dichroic coating.

The first light emitter 1312*a* is mounted to an end of the first beam splitter 1311*a*, such that the light emitted by the first light emitter 1312*a* may be initially projected into the first beam splitter 1311*a* in a direction generally parallel to the optical axis of the high optical resolution imaging device 304; the second light emitter 1312*b* is mounted to a top of the first beam splitter 1311*a*, such that the light emitted by the second light emitter 1311*b* may be initially projected into the first beam splitter 1311*a* in a direction generally perpendicular to the optical axis of the high optical resolution imaging device 304; and the third light emitter 1312*c* is mounted to a top of the second beam splitter 1311*b*, such that the light emitted by the third light emitter 1312*c* may be initially projected into the second beam splitter 1311*b* in a direction generally perpendicular to the optical axis of the high optical resolution imaging device 304. In this manner, the blue light may pass completely through the beam splitters 1311*a*, 1311*b* and lightpipe 1310 with high transmission; the green light may be selectively reflected into the optical axis of the high optical resolution imaging device 304 and mix immediately with the blue light; and the red light may be selectively reflected into the optical axis of the high optical resolution imaging device 304 and mix immediately with the blue and green light. The lightpipe 1310 may be configured to mix and make uniform the light received from the beam splitters 1311*a*, 1311*b*. In this manner, the light emitted by the light emitters 1312*a*, 1312*b*, 1312*c* may be tuned to improve the whiteness of the light, which may then be transmitted out of the lightpipe 1310 toward the flowcell 302.

Figure 19:
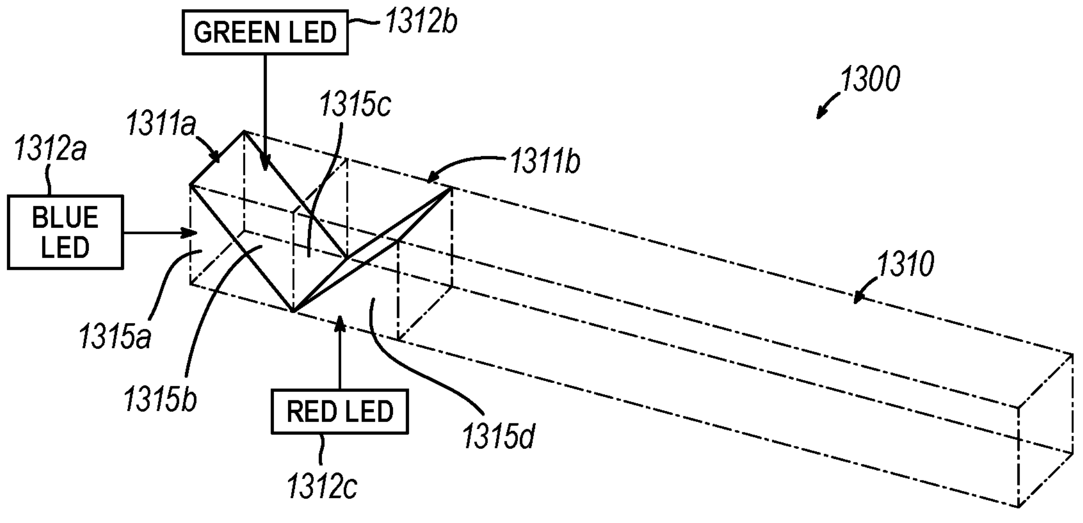
FIG. 19 illustrates a perspective view of an alternative arrangement of the lighting module of FIG. 18.

FIG. 19 shows an alternative arrangement in which the third light emitter 1312*c* is mounted to a bottom of the second beam splitter 1311*b*, such that the light emitted by the third light emitter 1312*c* may be initially projected into the second beam splitter 1311*b* in a direction generally perpendicular to the optical axis of the high optical resolution imaging device 304.

C. Examples of White Light LED Illumination Modules with Multiple LEDs

Figure 20:
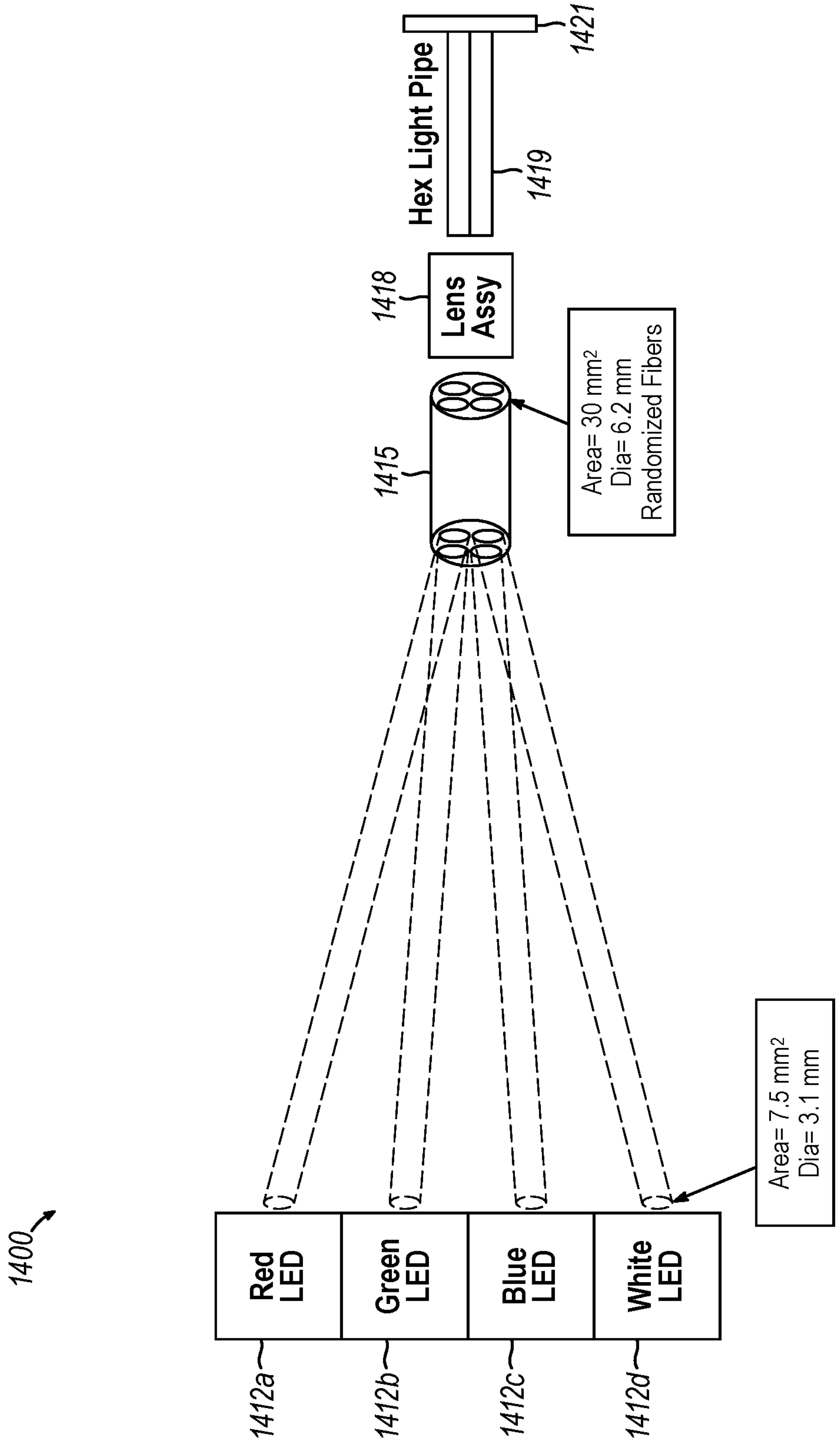
FIG. 20 illustrates a schematic view of another exemplary lighting module.

FIG. 20 schematically shows an example of another lighting module 1400 that may be readily incorporated into a system such as shown in FIG. 1 or FIG. 2 in place of the lighting module 300 described above. In the example shown, the lighting module 1400 includes a mounting and/or housing (not shown), a plurality of light emitters 1412*a*, 1412*b*, 1412*c*, 1412*d*, LED combiner optics 1415, an LED collimator or condenser lens assembly 1418, an LED hexagonal homogenizer light pipe 1419, an optical diffuser wafer 1421, a color filter (not shown) for adjusting the final illumination output, and a stage alignment calibrator (not shown). The light emitters 1412*a*, 1412*b*, 1412*c*, 1412*d* may each be any suitable light source including, for example, a light emitting diode (LED), or any other suitable light emitter for providing either pulsed or continuous illumination. In some embodiments, the light emitters 1412*a*, 1412*b*, 1412*c*, 1412*d* may each be configured to emit a light of a different color than the other light emitters 1412*a*, 1412*b*, 1412*c*, 1412*d*. For example, the first light emitter 1412*a* may include a red LED configured to emit red light having a wavelength of between about 600 nanometers and about 650 nanometers, such as about 620 nanometers; the second light emitter 1412*b* may include a green LED configured to emit green light having a wavelength of between about 470 nanometers and about 600 nanometers, such as about 525 nanometers; the third light emitter 1412*c* may include a blue LED configured to emit blue light having a wavelength of between about 400 nanometers and about 470 nanometers, such as about 450 nanometers; and/or the fourth light emitter 1412*d* may include a high power white LED configured to emit white light.

The monochromatic colored light emitters 1412*a*, 1412*b*, 1412*c* may be configured to augment the final illumination light beam and fill the color spectrum breaks provided by the white light emitter 1412*d*. While three monochromatic colored light emitters 1412*a*, 1412*b*, 1412*c* are shown, it will be appreciated that only one, two, or more than three monochromatic colored light emitters 1412*a*, 1412*b*, 1412*c* may be used. Thus, lighting module 1400 may be used for hematology flow imaging, and may be capable of providing programmable monochromatic, multicolor or white light illumination in the visible spectrum.

In some embodiments, the lighting module 1400 may be configured to provide multi-strobing illumination, such as double and triple strobe. Lighting module 1400 may be capable of enabling or disabling any combination of individual LEDs 1412*a*, 1412*b*, 1412*c*, 1412*d*. Lighting module 1400 may be capable of adjusting individual LED Power from 100% down to 0%. The light output from light pipe 1419 may be directed to the flow cell, and may include homogenized light output that is, red, green, blue or white by combining the light emitted from RGB LED sources 1412*a*, 1412*b*, 1412*c* and W LED source 1412*d*, and may provide illumination of the sample with a continuous color spectrum.

In addition the power LEDs 1412*a*, 1412*b*, 1412*c*, 1412*d*, the electronics of the lighting module 1400 may include LED switching and capacitive discharge (e.g., 1 per LED); a pulse width generator (e.g., 1 channel for all LEDs); and digitally controlled discharge power supply controller (e.g., 4 channels).

Figure 21:
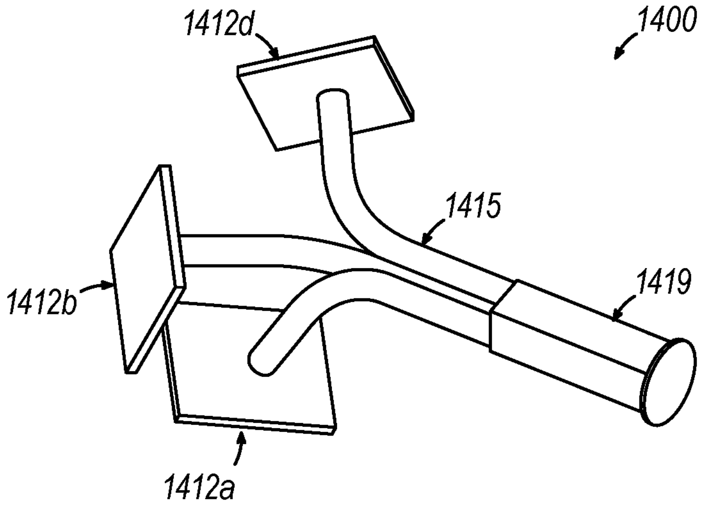
FIG. 21 illustrates a partial perspective view of an alternative arrangement of the lighting module of FIG. 20.

FIG. 21 shows an alternative arrangement having only two monochromatic colored light emitters 1412*a*, 1412*b*.

Figure 22:
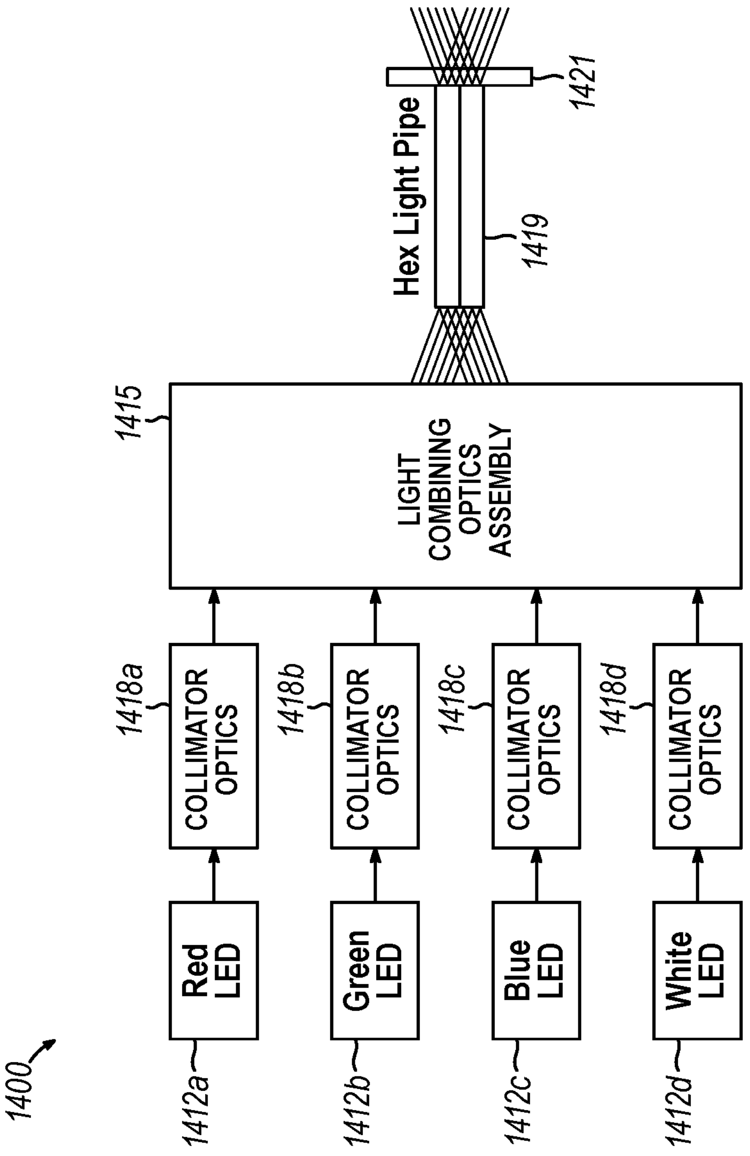
FIG. 22 illustrates a schematic view of another alternative arrangement of the lighting module of FIG. 20.

FIG. 22 shows an alternative arrangement having dedicated collimator optics 1418*a*, 1418*b*, 1418*c*, 1418*d* for each light emitter 1412*a*, 1412*b*, 1412*c*, 1412*d*.

D. Example of Block Heater for Sample Incubation

Figure 23:
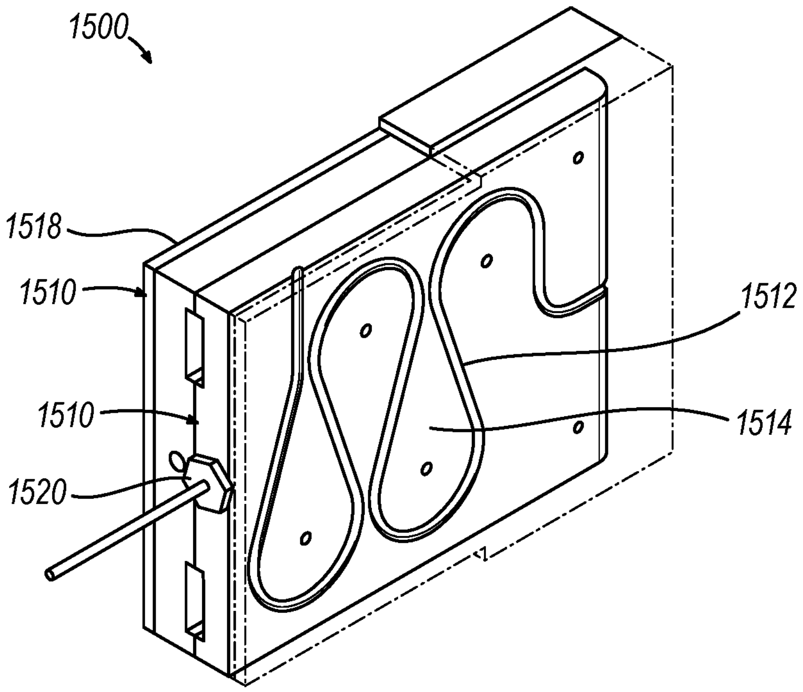
FIG. 23 illustrates a perspective view of an exemplary heating module.

FIG. 23 shows an example of a heating module 1500 that includes a pair of metal blocks 1510 that have high thermal conductance and low thermal retention. For example, blocks 1510 may each be formed of aluminum. To maintain stable temperature, large masses of heater blocks 1510 are used to increase thermal retention and lower temperature fluctuation due to active heating control. To increase the efficiency of heat conduction to all cells in the sample, a small inner-diameter solid tubing 1512 is used as the incubation vessel to increase the heat exchange surface contact area. The tubing 1512 is grooved inside the aluminum blocks 1510 in serpentine style to balance the amount of left and right turns that blood cell needs to travel through to prevent centrifugal separation in sample integrity. A heating element, such as one or more heater pads 1514, is located in a center cavity 1516 of the aluminum blocks 1510 to provide even heating to the module 1500 and lower losses to ambience. To maintain the temperature gradient even at the boundaries of the module 1500, non-heat conductive material 1518 is used to enclose the blocks 1510 to prevent heat exchange to the environment. A thermistor 1520 for heat control feedback is also located inside the blocks 1510.

Figure 24:
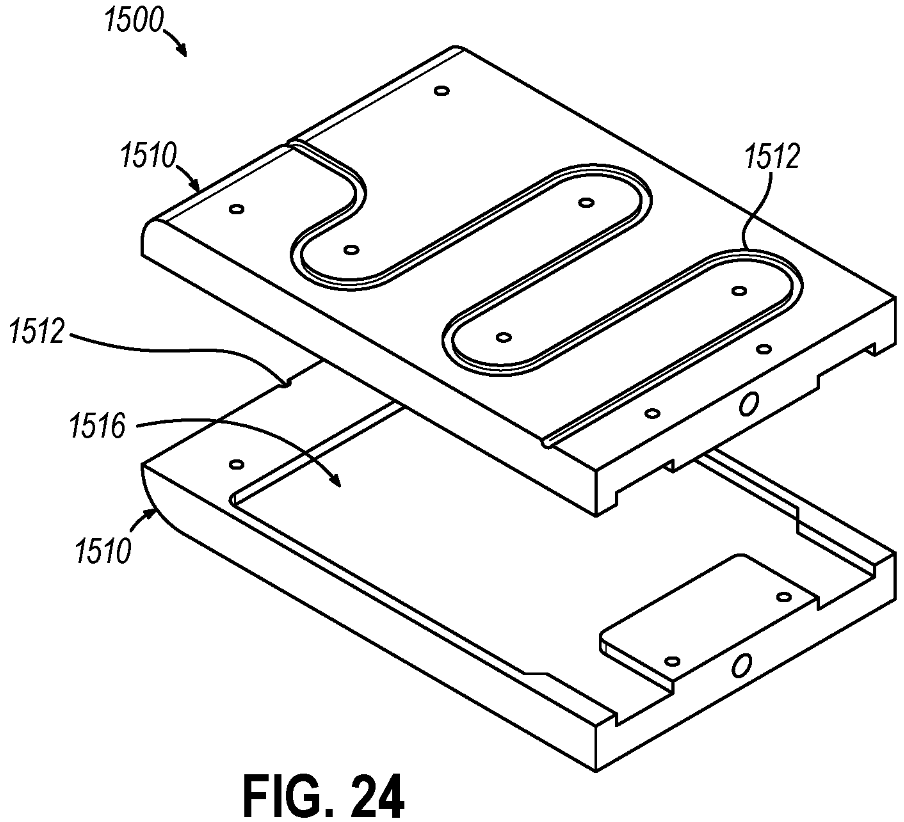
FIG. 24 illustrates an exploded perspective view of an alternative arrangement of the heating module of FIG. 23.

FIG. 24 shows an alternative arrangement having a modified serpentine tubing 1512.

E. Example of Sample Regurgitative Mixing

Figure 25:
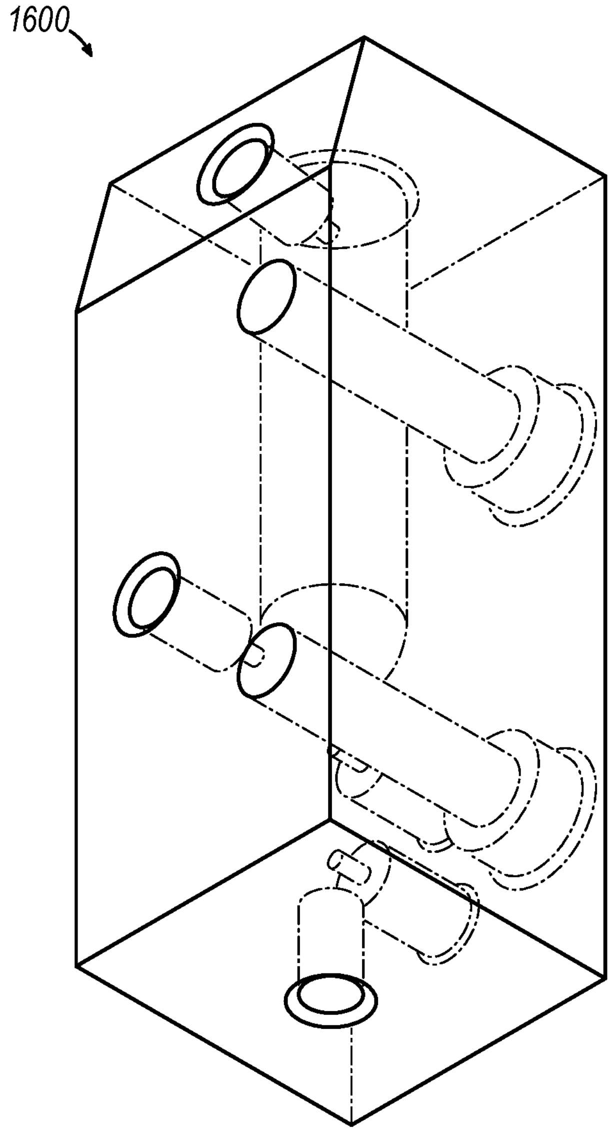
FIG. 25 illustrates a perspective view of an exemplary chamber.

In some instances, it may be desirable to improve upon the methods of power delivery mixing and air bubble mixing in one or more chambers, such as chamber 1600 shown in FIG. 25. For example, regurgitative mixing may use repeated sample pull/push and controlled air bubble to increase mixing power on the one or more chambers 1600.

Figure 26A:
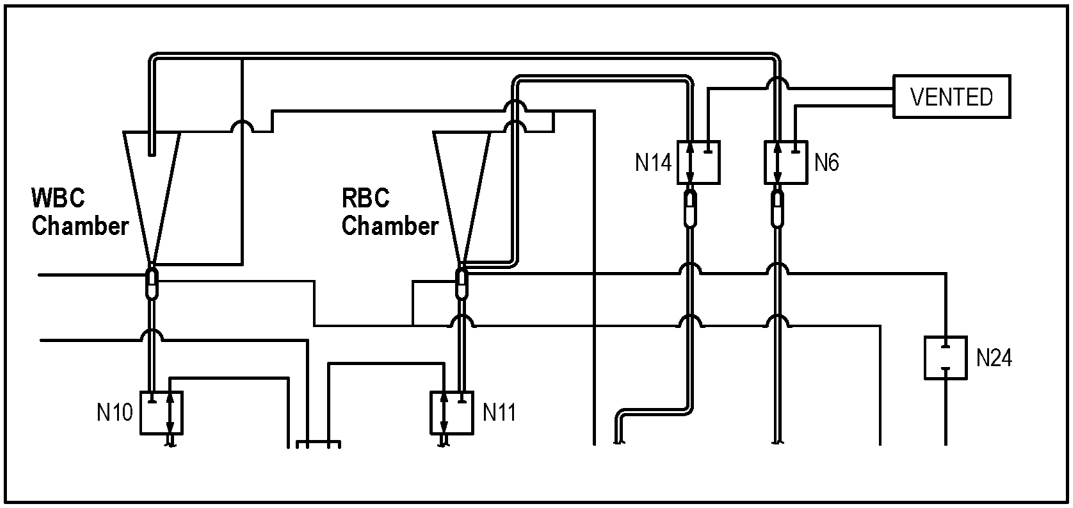
FIG. 26A illustrates a schematic view of a first step of an exemplary regurgitative mixing process for the chamber of FIG. 25.
Figure 26B:
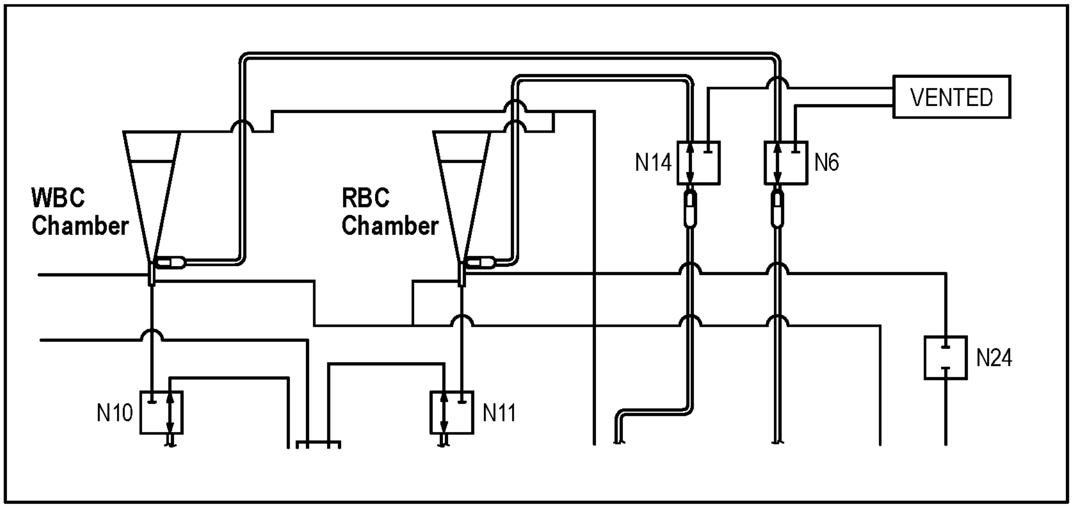
FIG. 26B illustrates a schematic view of a second step of the regurgitative mixing process for the chamber of FIG. 25.

FIGS. 26A-26B show an example of such regurgitative mixing, in which a high volume air gap of about 2-3 inches is introduced in each of the reagent delivery line for RBC and WBC by opening and pulling through the vented port on N14 and N8. The tubing length between the vent valve and chamber may hold the same volume as the targeted reagent delivery volume (FIG. 26A). The vented port may then be switched to the delivery line to do the pre-dispense (FIG. 26B). As soon as the blood sample is delivered to the chambers 1600, diluted sample may be pulled back without passing the air gap through vent valves, then pushed out with slightly more volume along with some air to cream air bubble mixing. The same pull and push motion may repeat about 2-5 times with incremented volume to achieve cumulative agitated mixing. Eventually most of the air gap is consumed with little left between reagent port and reagent in the tubing as to prevent sample diffusion.

It will be appreciated that controlled air bubble helps mixing without causing lyse reagent forming. Repeated power delivery can better mix small volume sample and adjustable to the degree of homogeneity needed. Mixing may be evaluated to be efficient and homogenous based on the low count variation in the entire acquisition time. Thus, no dedicated mixing component may be required.

F. Examples of Stain AC Heater

In some instances, it may be desirable to heat up the stain/blood mixture directly instead of transferring the heat from a heating source. In this regard, the stain may have a conductivity of about 0.011*siemens/cm and/or a resistivity of 0.909*Ω*m. Electrically, this makes up a resistive element. A resistive element heats up when current flows through it. In this situation the fluid is the heat source, and the power dissipation is even along the length of the path as each differential length has the same resistivity. This produces consistent heating in the stain/blood mixture yielding consistent cell staining.

The volume used in the imaging breadboards may be about 0.2 mL. The amount of heat (energy) needed to raise this volume depends on the initial stain/blood mixture temperature, assumed to be the ambient condition: 26 J with an ambient of 15 C; 18 J with an ambient of 25 C; 12 J with an ambient of 32 C.

One factor to make these electrodes with minimal mass to minimize temperature losses and avoid temperature gradients in the electrode's proximity. Another factor is to use alternating current or AC coupled excitation to avoid electrolysis and contact pitting.

Figure 27A:
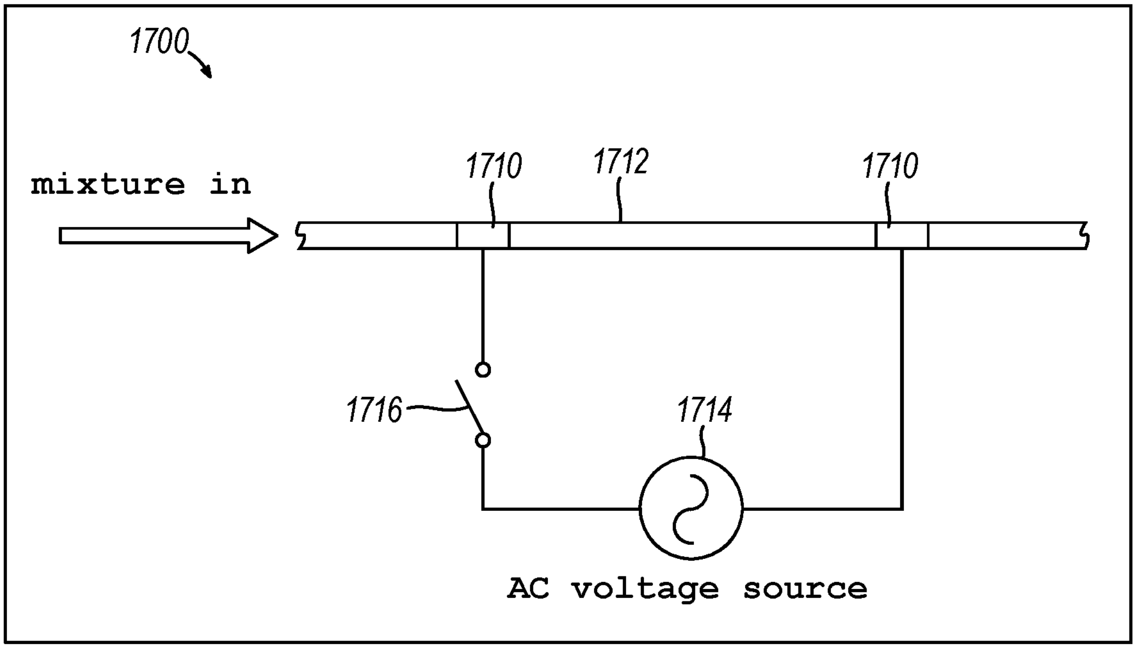
FIG. 27A illustrates a schematic view of an exemplary AC heater, showing a first step of an exemplary heating process.
Figure 27B:
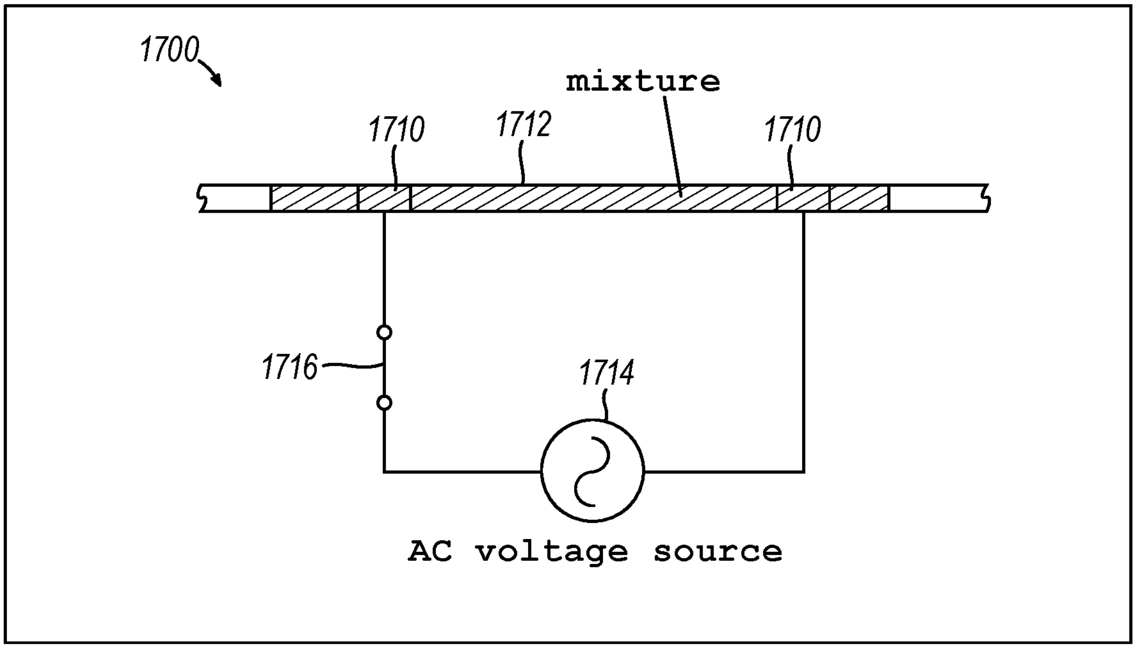
FIG. 27B illustrates a schematic view of the AC heater of FIG. 27A, showing a second step of the heating process.

FIGS. 27A-27B show an example of an AC heater 1700 in which a column of stain/blood mixture is used as a resistor by incorporating conductive electrodes 1710 at each end of a tubing section 1712 containing the mixture to be heated. A voltage source 1714 can be applied as shown in FIG. 27A, in which a switch 1716 symbolizes a means of controlling the voltage source 1714 (e.g., a PID control driven from a temperature feedback sensor to close the loop). As the mixture is introduced covering both electrodes 1710, the switch 1716 is closed and the mixture heats up, as shown in FIG. 27B.

Figure 28:
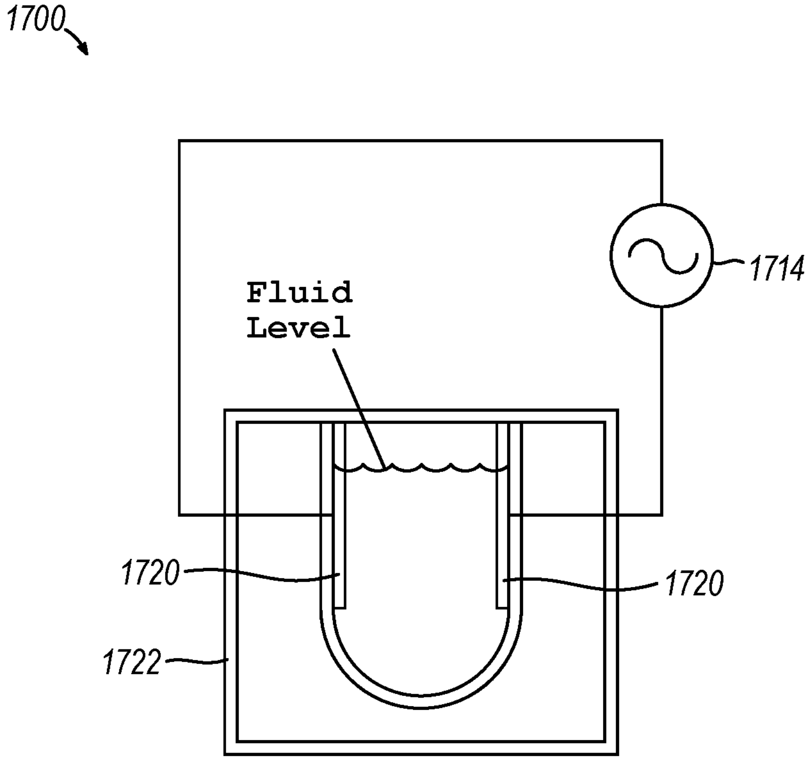
FIG. 28 illustrates a schematic view of an alternative arrangement of the AC heater of FIG. 27A.

This method can be applied not only to fluid in tubing sections but also to any geometry that allows the placement of electrodes across a given fluid volume. For example, the method could be applied to an alternative arrangement having an electrically insulated chamber 1722 as exemplified in FIG. 28. As shown, the electrodes 1720 may each be a thin conductive metal film built into the chamber 1722 or deposited on the inner surface of the chamber 1722 via electro-chemical methods. This approach yields the ability to pre-heat the stain prior to blood introduction and in addition to mix and heat the stain/blood mixture to improve the homogeneity of the prepared sample. This approach may gain time as the stain/blood mixture does not need to be transported into a separate heater, thereby improving the throughput of the staining process. Less transporting may result in less stress to the cells so that morphological features may be better preserved.

Figure 29:
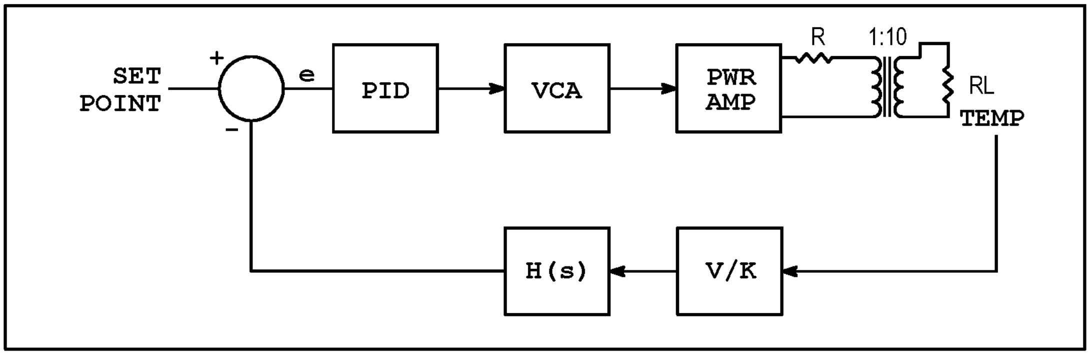
FIG. 29 illustrates a schematic view of an exemplary voltage-controlled amplitude amplifier for providing voltage to the AC heater of FIGS. 27A-28.
Figure 30:
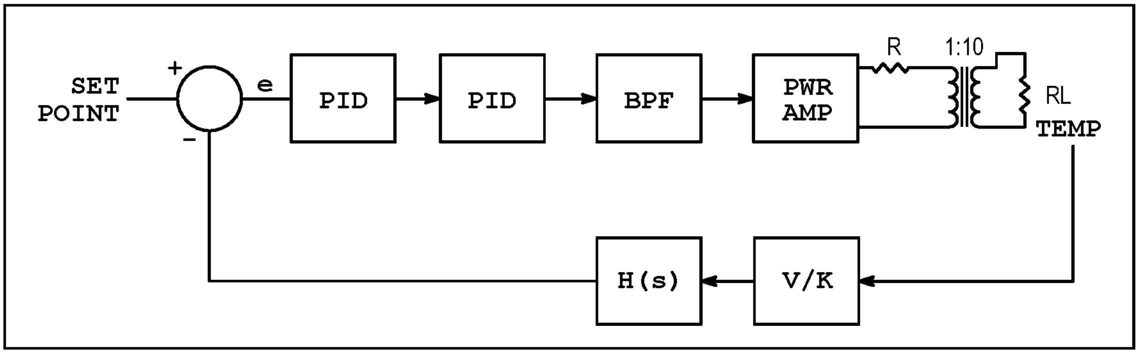
FIG. 30 illustrates a schematic view of an exemplary voltage-controlled oscillator and band pass filter for providing voltage to the AC heater of FIGS. 27A-28.
Figure 31:
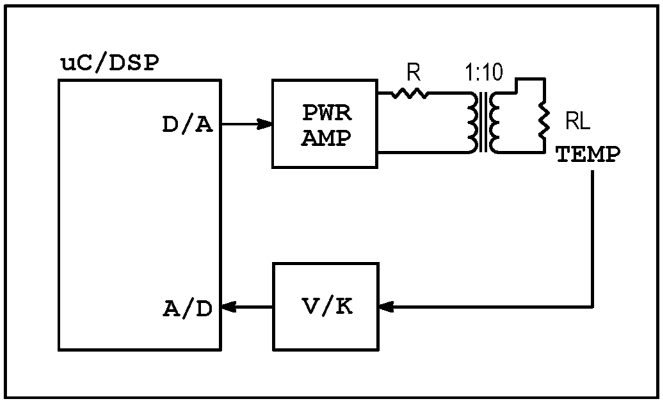
FIG. 31 illustrates a schematic view of an exemplary control loop integrated in a microcontroller/DSP for providing voltage to the AC heater of FIGS. 27A-28.

It will be appreciated that the voltage needed for either arrangement of AC heater 1700 may be produced in a variety of manners. For example, FIG. 29 shows a manner of producing the voltage needed using a voltage-controlled amplitude amplifier to control the amplitude; FIG. 30 shows another manner of producing the voltage needed using a voltage-controlled oscillator and a band pass filter used to alter the voltage magnitude; and FIG. 31 shows another manner of producing the voltage needed by integrating the control loop in a microcontroller/DSP.

VI. Miscellaneous

Any one or more of the teachings herein may be combined with any one or more of the teachings disclosed in US Pat. App. Pub. No. 2024/0027310, entitled "Biological Sample Staining Module and Biological Analysis Systems and Methods," filed on even date herewith; and/or US Pat. App. Pub. No. 2024/0024867, entitled "Flowcell Holder and Biological Analysis Systems and Methods," filed on even date herewith. The disclosure of each of these US patent applications is incorporated by reference in their entirety herein.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention. Accordingly, the present invention is not limited to the embodiments described above or depicted in the drawings, and various embodiments and modifications can be made without departing from the scope of the claims below.

What is claimed is:

1. A biological imaging analyzer comprising:
- a staining module configured to stain cells of a biological sample so as to produce stained cells;
- a lighting module configured to illuminate the stained cells, the lighting module comprising a plurality of pulsed lights having different wavelengths to produce a white light, wherein the lighting module comprises a lightpipe configured to convey the white light to an imaging region of a flowcell, wherein a distance between an exit of the lightpipe and the imaging region of the flowcell is fixed; and
- an imaging module configured to capture images of the stained cells, the imaging module defining an optical axis.

2. The biological imaging analyzer of claim 1, further comprising a flowcell configured to flow the stained cells therethrough, the flowcell further comprising an imaging region where the images are captured.

3. The biological imaging analyzer of claim 1, wherein the imaging module comprises a camera.

4. The biological imaging analyzer of claim 1, wherein the stained cells are white blood cells with a stained nuclear region.

5. The biological imaging analyzer of claim 1, wherein the plurality of pulsed lights of the lighting module comprise three light emitting diodes.

6. The biological imaging analyzer of claim 5, wherein the three light emitting diodes comprise a red light emitting diode, a blue light emitting diode, and a green light emitting diode.

7. The biological imaging analyzer of claim 5, further comprising three dichroic filters.

8. The biological imaging analyzer of claim 1, further comprising a collimator configured to combine the plurality of pulsed lights into the white light.

9. The biological imaging analyzer of claim 8, wherein the lightpipe is configured to randomize the white light.

10. A biological imaging analyzer comprising:
- a lighting module configured to illuminate stained cells, the lighting module comprising a plurality of pulsed lights having different wavelengths to produce a white light, the lighting module further comprising a lightpipe configured to convey the white light to an imaging region of a flowcell, wherein a distance between an exit of the lightpipe and the imaging region of the flowcell is fixed;
- the flowcell, wherein the flowcell is configured to flow the stained cells therethrough, the flowcell including an imaging region; and
- an imaging module configured to capture images of the stained cells at the imaging region of the flowcell, the imaging module defining an optical axis.

11. The biological imaging analyzer of claim 10, wherein the imaging module comprises a camera.

12. The biological imaging analyzer of claim 10, wherein the stained cells are white blood cells with a stained nuclear region.

13. The biological imaging analyzer of claim 10, wherein the plurality of pulsed lights of the lighting module comprise three light emitting diodes.

14. The biological imaging analyzer of claim 13, wherein the three light emitting diodes comprise a red light emitting diode, a blue light emitting diode, and a green light emitting diode.

15. The biological imaging analyzer of claim 13, further comprising three dichroic filters.

16. The biological imaging analyzer of claim 10, further comprising a collimator configured to combine the plurality of pulsed lights into the white light.

17. The biological imaging analyzer of claim 16, wherein the lightpipe is configured to randomize the white light.

18. A method of flow imaging a biological sample comprising:

flowing the biological sample including a plurality of stained cells through an image capture region of a flowcell;

utilizing a lighting module to illuminate the image capture region with a plurality of pulsed lights having different wavelengths to produce a white light as the biological sample flows through the image capture region of the flowcell, wherein the lighting module comprises a lightpipe configured to convey the white light to an image capture region of the flowcell, wherein a distance between an exit of the lightpipe and the image capture region of the flowcell is fixed; and capturing images of the plurality of stained cells at the image capture region with a camera, the camera defining an optical axis.

19. The method of claim 18, further comprising combining the plurality of pulsed lights into the white light.

20. The method of claim 19, further comprising randomizing the white light.

* * * * *